(12) United States Patent
Mizoguchi

(10) Patent No.: US 12,418,030 B2
(45) Date of Patent: Sep. 16, 2025

(54) NON-AQUEOUS ELECTROLYTE SECONDARY BATTERY, COLLECTOR, AND METHOD FOR MANUFACTURING NON-AQUEOUS ELECTROLYTE SECONDARY BATTERY

(71) Applicant: FUJIFILM Corporation, Tokyo (JP)

(72) Inventor: Takao Mizoguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 636 days.

(21) Appl. No.: 17/857,048

(22) Filed: Jul. 4, 2022

(65) Prior Publication Data
US 2022/0336820 A1 Oct. 20, 2022

Related U.S. Application Data

(63) Continuation of application No. PCT/JP2021/000882, filed on Jan. 13, 2021.

(30) Foreign Application Priority Data

Jan. 17, 2020 (JP) .................................. 2020-006021

(51) Int. Cl.
*H01M 4/66* (2006.01)
*H01M 10/0525* (2010.01)
*H01M 4/02* (2006.01)

(52) U.S. Cl.
CPC ........... *H01M 4/667* (2013.01); *H01M 4/661* (2013.01); *H01M 4/663* (2013.01); *H01M 10/0525* (2013.01); *H01M 2004/021* (2013.01)

(58) Field of Classification Search
None
See application file for complete search history.

(56) References Cited

U.S. PATENT DOCUMENTS 7,560,192 B2 7/2009 Hwang et al.
7,736,809 B2 6/2010 Hwang et al.
(Continued)

FOREIGN PATENT DOCUMENTS

CN 103390753 11/2013
JP H04246173 9/1992
(Continued)

OTHER PUBLICATIONS

Machine Translation of JP2015088465 (Year: 2015).*
(Continued)

*Primary Examiner* — Wyatt P McConnell
(74) *Attorney, Agent, or Firm* — JCIPRNET

(57) ABSTRACT

Provided are a non-aqueous electrolyte secondary battery including a positive electrode having a positive electrode collector and a positive electrode active material layer in contact with the positive electrode collector; a negative electrode having a negative electrode collector and a negative electrode active material layer in contact with the negative electrode collector; and a separator disposed between the positive electrode and the negative electrode, in which at least one of the positive electrode collector or the negative electrode collector is a laminate having a resin film and a laminated structure of a conductive layer and a contact resistance reducing layer disposed on one or both surfaces of the resin film; a collector suitable for use in the non-aqueous electrolyte secondary battery; and a method for manufacturing the non-aqueous electrolyte secondary battery.

31 Claims, 3 Drawing Sheets

(56) References Cited

U.S. PATENT DOCUMENTS

| | | |
|---|---|---|
| 9,490,485 B2 | 11/2016 | Inoue |
| 2013/0022865 A1 | 1/2013 | Nishinaka et al. |
| 2013/0295432 A1* | 11/2013 | Inoue ................ H01M 10/0418 |
| | | 174/268 |

FOREIGN PATENT DOCUMENTS

| | | |
|---|---|---|
| JP | H1140980 | 2/1999 |
| JP | 2004288520 | 10/2004 |
| JP | 2005108835 | 4/2005 |
| JP | 2008117655 | 5/2008 |
| JP | 2012129114 | 7/2012 |
| JP | 2012185938 | 9/2012 |
| JP | 2013008564 | 1/2013 |
| JP | 2013133514 | 7/2013 |
| JP | 2013143314 | 7/2013 |
| JP | 2013151730 | 8/2013 |
| JP | 2013254727 | 12/2013 |
| JP | 2014152344 | 8/2014 |
| JP | 2015088465 | 5/2015 |
| JP | 2015198020 | 11/2015 |
| JP | 2016054277 | 4/2016 |
| JP | 2017182905 | 10/2017 |
| JP | 2019033066 | 2/2019 |
| KR | 20120002433 | 1/2012 |
| KR | 20130124901 | 11/2013 |
| WO | 2009111744 | 9/2009 |
| WO | 2012127561 | 9/2012 |
| WO | 2014156362 | 10/2014 |
| WO | 2015076099 | 5/2015 |

OTHER PUBLICATIONS

Machine Translation of KR20120002433 (Year: 2012).*
"International Search Report (Form PCT/ISA/210) of PCT/JP2021/000882," mailed on Mar. 23, 2021, with English translation thereof, pp. 1-7.
"Written Opinion of the International Searching Authority (Form PCT/ISA/237) of PCT/JP2021/000882," mailed on Mar. 23, 2021, with English translation thereof, pp. 1-8.
"Office Action of Japan Counterpart Application", issued on Feb. 27, 2024, with English translation thereof, p. 1-p. 8.
"Search Report of Europe Counterpart Application", issued on Dec. 13, 2023, p. 1-p. 10.
"Notice of Reasons for Refusal of Japan Counterpart Application", issued on Oct. 17, 2023, with English translation thereof, p. 1-p. 10.
"Office Action of Korea Counterpart Application", issued on Nov. 14, 2024, with English translation thereof, p. 1-p. 20.
"Office Action of Japan Counterpart Application", issued on May 30, 2023, with English translation thereof, p. 1-p. 8.
"Office Action of China Counterpart Application", issued on Jan. 12, 2024, with English translation thereof, p. 1-p. 39.

* cited by examiner

NON-AQUEOUS ELECTROLYTE SECONDARY BATTERY, COLLECTOR, AND METHOD FOR MANUFACTURING NON-AQUEOUS ELECTROLYTE SECONDARY BATTERY

CROSS-REFERENCE TO RELATED APPLICATIONS

This application is a Continuation of PCT International Application No. PCT/JP2021/000882 filed on Jan. 13, 2021, which claims priority under 35 U.S.C. § 119 (a) to Japanese Patent Application No. 2020-006021 filed in Japan on Jan. 17, 2020. Each of the above applications is hereby expressly incorporated by reference, in its entirety, into the present application.

BACKGROUND OF THE INVENTION

1. Field of the Invention

The present invention relates to a non-aqueous electrolyte secondary battery, a collector, and a method for manufacturing a non-aqueous electrolyte secondary battery.

2. Description of the Related Art

A non-aqueous electrolyte secondary battery represented by a lithium-ion secondary battery exhibits high energy density, excellent storage performance, excellent low-temperature operability, and the like and is widely used in a portable electronic apparatus such as a cellular phone or a notebook computer. In addition, a battery has been increased in size so that the battery can be used in a transportation apparatus such as an automobile, and the battery can be used as a storage device for night-time electric power or electric power generated by natural energy power generation.

In order to increase an energy density of a lithium ion secondary battery, it has been proposed to use a rigid polymer film having metal films formed on both surfaces thereof as a collector (JP2005-108835A). According to the technique described in JP2005-108835A, it is said that the battery service life can be increased by 10% to 99% by adjusting the thickness of the metal film formed on the rigid polymer film.

The non-aqueous electrolyte secondary battery has a high energy density and therefore overcharge of the battery or the occurrence of a short circuit inside the battery triggers so-called thermal runaway or ignition. Therefore, various measures have been taken to ensure the safety in the non-aqueous electrolyte secondary battery. For example, JP2012-185938A describes a lithium ion secondary battery using a collector having a multi-layer structure. In the technique described in JP2012-185938A, it is said that, by using a collector in which metal layers are formed on both surfaces of a resin film having a low melting point, the resin film having a low melting point melts in a case where abnormal heat generation occurs, so the electrode is damaged and the current is then cut, resulting in the suppression of the temperature rise inside the battery and consequently the prevention of ignition.

SUMMARY OF THE INVENTION

According to the techniques described in the above patent documents, it is said that the energy density of the lithium ion secondary battery can be increased and the safety can be enhanced by using a collector with metal layers provided on both surfaces of a resin film as the collector of the lithium ion secondary battery. However, even in a case where such a collector is adopted, an oxide film may occur or a side reaction between the metal layer and the electrolyte may occur on the surface of the metal layer constituting the collector, which causes a decrease in the adhesiveness between the metal layer and the electrode active material layer or the electron conductivity. Therefore, there is room for further improvement in improving battery service life (cycle characteristics).

An object of the present invention is to provide a non-aqueous electrolyte secondary battery having excellent cycle characteristics and excellent safety. Another object of the present invention is to provide a collector suitable for use in the non-aqueous electrolyte secondary battery and a method for manufacturing the non-aqueous electrolyte secondary battery.

The present inventors have made extensive studies in view of the above objects. As a result, it has been found that, in a case where a laminate in which a laminated structure of a conductive layer and a contact resistance reducing layer is formed on one surface of a resin film as a support is used as a collector, the obtained non-aqueous electrolyte secondary battery has sufficiently improved cycle characteristics, and is less likely to ignite or emit smoke at the time of an internal short circuit, which leads to excellent safety.

The present invention has been further studied and completed based on these findings.

The foregoing objects have been achieved by the following means.

[1]

A non-aqueous electrolyte secondary battery including:
  a positive electrode having a positive electrode collector and a positive electrode active material layer in contact with the positive electrode collector;
  a negative electrode having a negative electrode collector and a negative electrode active material layer in contact with the negative electrode collector; and
  a separator disposed between the positive electrode and the negative electrode,
  in which at least one of the positive electrode collector or the negative electrode collector is a laminate having a resin film and a laminated structure of a conductive layer and a contact resistance reducing layer disposed on one or both surfaces of the resin film.

[2]

The non-aqueous electrolyte secondary battery according to [1],
  in which, in a case where the positive electrode collector is constituted of the laminate, the conductive layer of the laminate is in contact with the resin film, and the contact resistance reducing layer of the laminate is in contact with the positive electrode active material layer, and
  in a case where the negative electrode collector is constituted of the laminate, the conductive layer of the laminate is in contact with the resin film, and the contact resistance reducing layer of the laminate is in contact with the negative electrode active material layer.

[3]

The non-aqueous electrolyte secondary battery according to [1] or [2],
  in which, in a case where the positive electrode collector is constituted of the laminate, the conductive layer of the laminate contains aluminum, and the contact resistance reducing layer of the laminate contains conductive carbon.

[4]

The non-aqueous electrolyte secondary battery according to any one of [1] to [3],
in which, in a case where the negative electrode collector is constituted of the laminate, the conductive layer of the laminate contains at least one of copper or nickel, and the contact resistance reducing layer of the laminate contains at least one of conductive carbon, nickel, titanium, tantalum, or tungsten.

[5]

The non-aqueous electrolyte secondary battery according to [4],
in which the conductive layer of the laminate constituting the negative electrode collector contains copper, and the contact resistance reducing layer of the laminate contains at least one of conductive carbon or nickel.

[6]

The non-aqueous electrolyte secondary battery according to [1] or [2],
in which the contact resistance reducing layer contains a rust preventive material.

[7]

The non-aqueous electrolyte secondary battery according to any one of [1] to [6],
in which a surface roughness Ra of at least one surface of the conductive layer is 0.3 µm or more.

[8]

The non-aqueous electrolyte secondary battery according to any one of [1] to [7],
in which at least one of the positive electrode collector or the negative electrode collector is a laminate having the resin film and the conductive layer disposed on one surface of the resin film, and a surface roughness Ra of at least one surface of the conductive layer is 0.3 µm or more.

[9]

The non-aqueous electrolyte secondary battery according to any one of [1] to [8],
in which a thickness of the contact resistance reducing layer is 10 to 3,000 nm.

[10]

The non-aqueous electrolyte secondary battery according to any one of [1] to [9],
in which a thickness of the conductive layer is 10 to 5,000 nm.

[11]

The non-aqueous electrolyte secondary battery according to any one of [1] to [10],
in which the resin film contains at least one of a polyester resin or a polyolefin resin.

[12]

The non-aqueous electrolyte secondary battery according to any one of [1] to [11],
in which a thickness of the resin film is 1 to 50 µm.

[13]

A collector including:
a resin film; and
a laminated structure of a conductive layer and a contact resistance reducing layer disposed on one or both surfaces of the resin film.

[14]

The collector according to [13],
in which the conductive layer is in contact with the resin film.

[15]

The collector according to [13] or [14],
in which the collector is a positive electrode collector, the conductive layer contains aluminum, and the contact resistance reducing layer contains conductive carbon.

[16]

The collector according to [13] or [14],
in which the collector is a negative electrode collector, the conductive layer contains at least one of copper or nickel, and the contact resistance reducing layer contains at least one of conductive carbon, nickel, titanium, tantalum, or tungsten.

[17]

The collector according to [16],
in which the conductive layer contains copper and the contact resistance reducing layer contains at least one of conductive carbon or nickel.

[18]

The collector according to [13] or [14],
in which the contact resistance reducing layer contains a rust preventive material.

[19]

The collector according to any one of [13] to [18],
in which a surface roughness Ra of at least one surface of the conductive layer is 0.3 µm or more.

[20]

The collector according to any one of [13] to [19],
in which a thickness of the contact resistance reducing layer is 10 to 3,000 nm.

[21]

The collector according to any one of [13] to [20],
in which a thickness of the conductive layer is 10 to 5,000 nm.

[22]

The collector according to any one of [13] to [21],
in which the resin film contains at least one of a polyester resin or a polyolefin resin.

[23]

The collector according to any one of [13] to [22],
in which a thickness of the resin film is 1 to 50 µm.

[24]

A method for manufacturing a non-aqueous electrolyte secondary battery including disposing the collector according to any one of [13] to [23] as at least any one collector of a positive electrode collector, a negative electrode collector, or a bipolar collector.

[25]

A non-aqueous electrolyte secondary battery including:
a positive electrode having a positive electrode collector and a positive electrode active material layer in contact with the positive electrode collector;
a negative electrode having a negative electrode collector and a negative electrode active material layer in contact with the negative electrode collector;
and a bipolar electrode having a bipolar collector, a positive electrode active material layer in contact with one surface of the bipolar collector, and a negative electrode active material layer in contact with the other surface of the bipolar collector,
in which the non-aqueous electrolyte secondary battery has a structure in which the positive electrode is disposed on the negative electrode active material layer side of the bipolar electrode with a separator interposed therebetween and the negative electrode is disposed on the positive electrode active material layer side of the bipolar electrode with a separator interposed therebetween, and the bipolar collector is a laminate having a resin film and a laminated structure of a conductive layer and a contact resistance reducing layer disposed on one or both surfaces of the resin film.

[26]

The non-aqueous electrolyte secondary battery according to [25],
in which the conductive layer of the laminate is in contact with the resin film.

[27]

The non-aqueous electrolyte secondary battery according to [26],
in which the conductive layer on the negative electrode active material layer side of the bipolar collector constituting the bipolar electrode is a copper foil.

[28]

The non-aqueous electrolyte secondary battery according to any one of [1] to [12] and [25] to [27],
in which the resin film is a coating film.

[29]

The non-aqueous electrolyte secondary battery according to any one of [25] to [28],
in which the conductive layer on the positive electrode active material layer side of the bipolar collector constituting the bipolar electrode contains at least one of aluminum or nickel.

[30]

The non-aqueous electrolyte secondary battery according to any one of [1] to [12] and [25] to [29],
in which a resin layer constituting the resin film contains at least one of elemental carbon, gold, nickel, or silver.

In the description of the present invention, any numerical range expressed by using "to" means a range including the numerical values before and after the "to" as a lower limit value and an upper limit value, respectively.

The "non-aqueous electrolyte" in the present invention means an electrolyte that contains substantially no water. That is, the "non-aqueous electrolyte" may contain a small amount of water as long as the effect of the present invention is not impaired. The "non-aqueous electrolyte" in the present invention has a water concentration of 200 ppm (mass basis) or less, preferably 100 ppm or less, and more preferably 20 ppm or less. It is practically difficult to make the non-aqueous electrolyte completely anhydrous, and the non-aqueous electrolyte usually contains 1 ppm or more of water.

The non-aqueous electrolyte in the present invention includes a non-aqueous electrolytic solution having ionic conductivity such as a lithium ion, a solid electrolyte, and the like.

The "non-aqueous electrolyte secondary battery" in the present invention broadly includes a secondary battery using a non-aqueous electrolyte.

The non-aqueous electrolyte secondary battery according to an aspect of the present invention has excellent cycle characteristics and excellent safety. The collector according to another aspect of the present invention is suitable as a collector of the non-aqueous electrolyte secondary battery according to the aspect of the present invention. The method for manufacturing a non-aqueous electrolyte secondary battery according to another aspect of the present invention makes it possible to obtain a non-aqueous electrolyte secondary battery having excellent cycle characteristics and excellent safety.

DESCRIPTION OF THE PREFERRED EMBODIMENTS

Preferred embodiments of the non-aqueous electrolyte secondary battery according to the embodiment of the present invention will be described, but the present invention is not limited to these embodiments except as specified in the present invention.

Non-Aqueous Electrolyte Secondary Battery

In a preferred embodiment of the non-aqueous electrolyte secondary battery according to the embodiment of the present invention (hereinafter, also referred to as the first embodiment), the non-aqueous electrolyte secondary battery has a positive electrode, a negative electrode, and a separator disposed between the positive electrode and the negative electrode. The positive electrode has a positive electrode collector and a positive electrode active material layer in contact with the positive electrode collector, and the negative electrode has a negative electrode collector and a negative electrode active material layer in contact with the negative electrode collector. The positive electrode active material layer and the negative electrode active material layer are each disposed toward the separator side and are disposed so as to face each other through the separator. There are two types of collectors included in the non-aqueous electrolyte secondary battery in the first embodiment, a positive electrode collector and a negative electrode collector. That is, the non-aqueous electrolyte secondary battery in the first embodiment does not have a bipolar collector which will be described later.

In the first embodiment, at least one of the positive electrode collector or the negative electrode collector is a laminate having a resin film and a laminated structure of a conductive layer and a contact resistance reducing layer disposed on one or both surfaces of the resin film. In the laminated structure of the conductive layer and the contact resistance reducing layer, the conductive layer side may face the resin film side, or the contact resistance reducing layer side may face the resin film side. Among collectors constituted of the above-mentioned laminate having such a laminated structure and the resin film, the collector applicable to the non-aqueous electrolyte secondary battery of the first embodiment is referred to as "collector (Z1)" in the present specification.

The collector (Z1) is preferably in a form in which the resin film and the conductive layer are in contact with each other. That is, in a case where the positive electrode collector is the collector (Z1), it is preferable that the contact resistance reducing layer of the collector (Z1) and the positive electrode active material layer are in contact with each other, and in a case where the negative electrode collector is the collector (Z1), it is preferable that the contact resistance reducing layer of the collector (Z1) and the negative electrode active material layer are in contact with each other.

Figure 1:
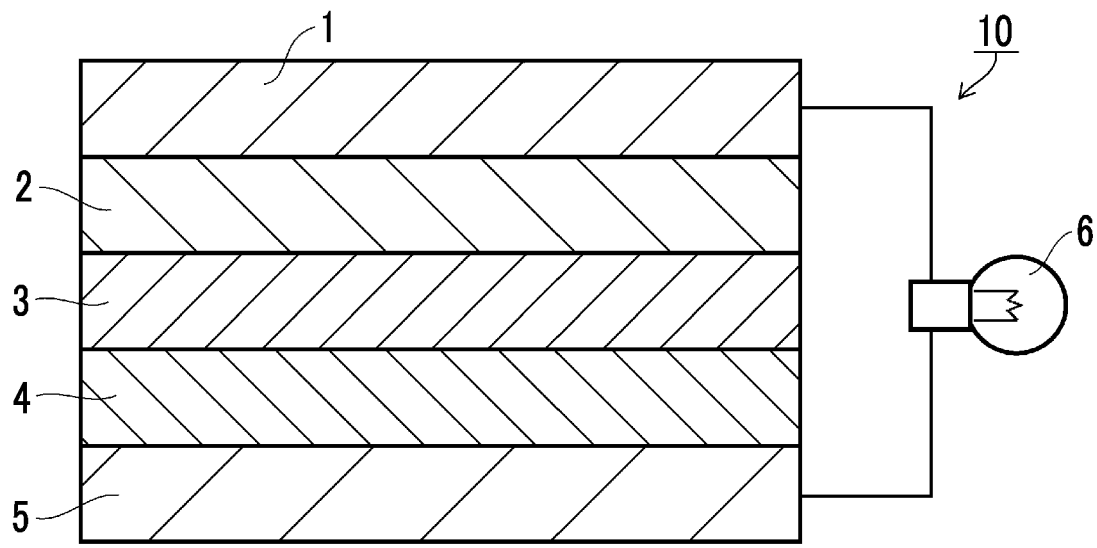
FIG. 1 is a vertical cross-sectional view schematically showing a basic laminated configuration of a sheet type non-aqueous electrolyte secondary battery.

In a case where the non-aqueous electrolyte secondary battery of the first embodiment is the sheet type shown in FIG. 1, it is preferable that at least the positive electrode collector is the collector (Z1), and it is also preferable that both the positive electrode collector and the negative electrode collector are the collectors (Z1). In this case, it is preferable that the collector (Z1) has a laminated structure of a conductive layer and a contact resistance reducing layer on one surface on which the positive electrode active material layer or the negative electrode active material layer is disposed.

Figure 3:
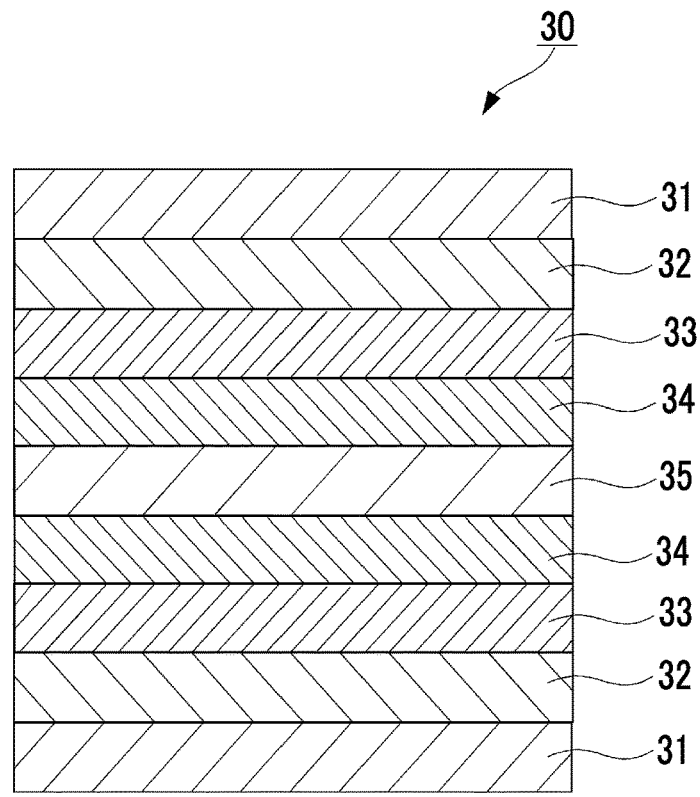
FIG. 3 is a vertical cross-sectional view schematically showing a basic laminated configuration of a monopolar type non-aqueous electrolyte secondary battery.
Figure 4:
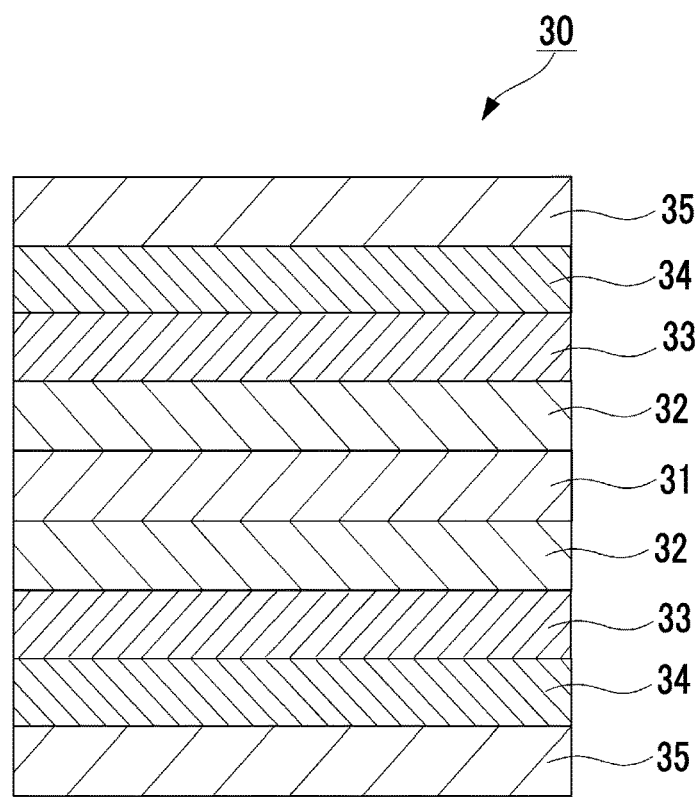
FIG. 4 is a vertical cross-sectional view schematically showing a basic laminated configuration of a monopolar type non-aqueous electrolyte secondary battery.

In addition, in a case where the non-aqueous electrolyte secondary battery of the first embodiment is the monopolar type shown in FIG. 3 or FIG. 4, it is preferable that the collector having the positive electrode active material layers disposed on both surfaces or the collector having the negative electrode active material layers disposed on both surfaces is the collector (Z1), and it is preferable that the collector (Z1) has laminated structures of a conductive layer and a contact resistance reducing layer on both surfaces. In the monopolar type shown in FIG. 3 or FIG. 4, the collector in which the positive electrode active material layer or the negative electrode active material layer is disposed on only one surface may be the collector (Z1) or may be not the collector (Z1).

The resin film layer constituting the "collector (Z1)" may have a monolayer structure or a multi-layer structure. The conductive layer may also have a monolayer structure or a multi-layer structure. In addition, the contact resistance reducing layer can also have a monolayer structure or a multi-layer structure.

In the first embodiment, the configuration of a normal non-aqueous electrolyte secondary battery can be adopted except for the configuration of the collector (Z1). First, the operating principle of a conventional general non-aqueous electrolyte secondary battery will be described.

FIG. 1 is a cross-sectional view schematically showing a laminated structure of a general sheet type non-aqueous electrolyte secondary battery 10, including an operating electrode at the time of operating as a battery. The sheet type non-aqueous electrolyte secondary battery 10 has a laminated structure having a negative electrode collector 1, a negative electrode active material layer 2, a separator 3, a positive electrode active material layer 4, and a positive electrode collector 5 in this order in a case of being viewed from the negative electrode side. The space between the negative electrode active material layer and the positive electrode active material layer is filled with a non-aqueous electrolyte (not shown), and the two electrode active material layers are separated from each other by the separator 3. The separator 3 has holes and functions as a positive electrode/negative electrode separation film that insulates between the positive electrode and the negative electrode while allowing an electrolyte and ions to pass therethrough in a normal battery use state. With such a structure, for example, in a case of a lithium ion secondary battery, electrons ($e^-$) are supplied to the negative electrode side through an external circuit at the time of battery charge, and at the same time, lithium ions ($Li^+$) move from the positive electrode through the electrolyte and are accumulated in the negative electrode. On the other hand, at the time of battery discharge, the lithium ions ($Li^+$) accumulated in the negative electrode are returned to the positive electrode side through the electrolyte, and electrons are supplied to an operating portion 6. In the illustrated example, a light bulb is used for the operating portion 6, and the light bulb is turned on by battery discharge. The separator 3 may be formed of a solid electrolyte.

In the present invention, the negative electrode collector 1 and the negative electrode active material layer 2 are collectively referred to as a negative electrode, and the positive electrode active material layer 4 and the positive electrode collector 5 are collectively referred to as a positive electrode.

In addition, it is also preferable that the non-aqueous electrolyte secondary battery of the first embodiment has a monopolar type laminated form schematically shown in FIG. 3 or FIG. 4. FIG. 3 and FIG. 4 show a laminated configuration of a monopolar type non-aqueous electrolyte secondary battery.

A monopolar type laminate 30 shown in FIG. 3 includes a negative electrode collector 31, a negative electrode active material layer 32, a separator 33, a positive electrode active material layer 34, a positive electrode collector 35, a positive electrode active material layer 34, a separator 33, a negative electrode active material layer 32, and a negative electrode collector 31 laminated in this order.

The monopolar type laminate 30 shown in FIG. 4 includes a positive electrode collector 35, a positive electrode active material layer 34, a separator 33, a negative electrode active material layer 32, a negative electrode collector 31, a negative electrode active material layer 32, a separator 33, a positive electrode active material layer 34, and a positive electrode collector 35 laminated in this order.

The materials, electrolytes, members, and the like used in the non-aqueous electrolyte secondary battery of the first embodiment are not particularly limited except for the configuration of the collector (Z1). As these materials, members, and the like, those used for a normal non-aqueous electrolyte secondary battery can be appropriately applied. In addition, as for the method for preparing the non-aqueous electrolyte secondary battery according to the embodiment of the present invention, a normal method can be appropriately adopted except for the configuration of the collector. For example, JP2016-201308A, JP2005-108835A, JP2012-185938A, and the like can be appropriately referred to.

The collector (Z1), which is a characteristic configuration of the non-aqueous electrolyte secondary battery of the first embodiment, will be described below.

Collector (Z1)

Figure 2:
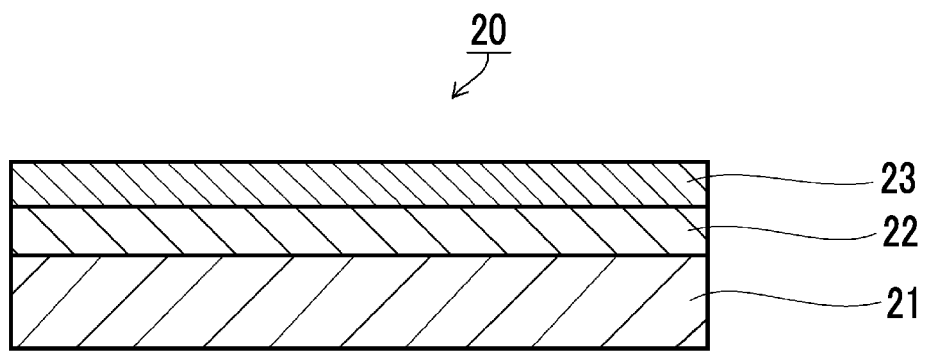
FIG. 2 is a vertical cross-sectional view schematically showing an embodiment of a laminated configuration of a collector of the present invention.

In the first embodiment, the collector (Z1) is adopted for at least one of the positive electrode collector or the negative electrode collector. The collector (Z1) is a laminate having a resin film and a laminated structure of a conductive layer and a contact resistance reducing layer disposed on one or both surfaces of the resin film. FIG. 2 shows a preferred form of the collector (Z1), in which the collector (Z1) has the above-mentioned laminated structure on one surface of the resin film and the resin film and the conductive layer are in contact with each other. FIG. 2 is a preferred embodiment as the collector (Z1) in which a positive electrode active material layer or a negative electrode active material layer is disposed on only one surface. The collector (Z1) is not limited to the form shown in FIG. 2 except as specified in the present invention.

In addition, the laminated structure of the conductive layer and the contact resistance reducing layer shown in FIG. 2 may be disposed on both surfaces of the resin film. The collector (Z1) having such a form is preferably used as a collector having positive electrode active material layers disposed on both surfaces or a collector having negative electrode active material layers disposed on both surfaces, in a monopolar type non-aqueous electrolyte secondary battery.

A collector (Z1) 20 shown in FIG. 2 has a resin film 21 as a support, and has a conductive layer 22 and a contact resistance reducing layer 23 in this order on the resin film 21. The configurations of the resin film, the conductive layer, and the contact resistance reducing layer constituting the collector (Z1) in the first embodiment will be described with reference to FIG. 2, but the configurations of the resin film, the conductive layer, and the contact resistance reducing layer described below are preferably applied to the collector (Z1) according to the first embodiment other than that having the configurations shown in FIG. 2.

Resin Film

The constituent material (resin) of the resin film 21 is not particularly limited, and a resin having electron-insulating properties can be suitably used. Examples of the resin having electron-insulating properties include a polyester resin, a polyolefin resin, a polyimide resin, a polytetrafluoroethylene resin, and a polyvinylidene fluoride resin, and it is preferable to use one or two or more of a polyester resin and a polyolefin resin.

Examples of the polyester resin include polyethylene terephthalate, polybutylene terephthalate, polyethylene naphthalate, polybutylene naphthalate, and polyethylene isophthalate. Among these polyester resins, polyethylene terephthalate is preferable.

Examples of the polyolefin resin include low-density polyethylene, linear low-density polyethylene, medium-density polyethylene, high-density polyethylene, ultra-low-density polyethylene, random copolymerized polypropylene, block copolymerized polypropylene, homopolypropylene, polybutene, polymethylpentene, an ethylene-vinyl acetate copolymer, an ionomer resin, an ethylene-(meth)acrylic acid copolymer, an ethylene-(meth) acrylic acid ester copolymer, an ethylene-butene copolymer, and an ethylene-hexene copolymer. Among these polyolefin resins, polyethylene or polypropylene is preferable, and polyethylene is more preferable.

The resin film 21 may have a monolayer structure or a multi-layer structure. In a case where the resin film 21 has a multi-layer structure, for example, the layer located on the electrode active material layer side (the positive electrode active material layer side or the negative electrode active material layer side, which is synonymous with the conductive layer side) may be a heat seal layer (a layer having heat sealability).

In addition, in a case where the resin film 21 has a multi-layer structure, for example, the layer located on the electrode active material layer side may be a layer having adhesiveness.

In addition, the resin film 21 may be composed of three or more layers, and the layer other than the surface layer may be a metal layer such as an aluminum layer. Such a form is also included in the "resin film" used in the present invention.

It is also preferable that the resin film 21 has a resin layer containing at least one of elemental carbon, gold, nickel, or silver. With such a configuration, it is possible to have conductivity in the thickness direction of the resin film, and it is possible to enhance the conductivity of the collector as a whole. For example, in the form of a monopolar type non-aqueous electrolyte secondary battery, in a case where a collector having the positive electrode active material layers disposed on both surfaces or a collector having the negative electrode active material layers disposed on both surfaces is the collector (Z1), the resin film 21 constituting the collector (Z1) can be in the form of having a resin layer containing at least one of elemental carbon, gold, nickel, or silver. In a case where the resin film 21 has a resin layer containing at least one of elemental carbon, gold, nickel, or silver, it is more preferable that the resin film 21 is composed of one resin layer containing at least one of elemental carbon, gold, nickel, or silver.

Examples of the form of the resin layer containing elemental carbon, which constitutes the resin film 21, include the resin film 21 formed of a resin in which the elemental carbon is kneaded into the resin (the elemental carbon is dispersed in the resin). Examples of elemental carbon include acetylene black, Ketjen black, carbon fiber, carbon nanofiber, and graphene. Examples of the type of resin to be combined with the elemental carbon include a polypropylene resin, an epoxy resin, a polystyrene resin, a polyethylene resin, an ABS resin, a polycarbonate resin, and a polyethylene terephthalate resin, among which a polypropylene resin or an epoxy resin is preferable. The resin in which elemental carbon is kneaded into the resin is also available on the market and is commercially available, for example, as LEOPOUND (trade name, manufactured by Lion Specialty Chemicals Co., Ltd.) or S-DASH PP (trade name, manufactured by NIPPON STEEL Chemical & Material Co., Ltd.). In this case, the content of elemental carbon in the resin film is preferably 1% to 80% by mass and more preferably 3% to 50% by mass.

The form of the resin layer containing gold, which constitutes the resin film 21, is preferably one in which a gold-coated particle (a resin particle coated with gold) is dispersed in the resin. The particle diameter of the gold-coated particle is preferably 0.1 to 500 μm and more preferably 1 to 100 μm. The particle diameter in the present invention means a volume-based median diameter. Examples of the type of resin to be combined with the gold-coated particle include a polypropylene resin, an epoxy resin, a polystyrene resin, a polyethylene resin, an ABS resin, a polycarbonate resin, and a polyethylene terephthalate resin, among which a polypropylene resin or an epoxy resin is preferable. The gold-coated particle is also available on the market and is commercially available, for example, as MICROPEARL AU (trade name, manufactured by Sekisui Chemical Co., Ltd.) or BRIGHT GNR-MX (trade name, manufactured by Nippon Chemical Co., Ltd.).

The form of the resin layer containing nickel, which constitutes the resin film 21, is preferably one in which a nickel particle is dispersed in the resin. The particle diameter of the nickel particle is preferably 0.1 to 500 μm and more preferably 0.5 to 100 μm. Examples of the type of resin to be combined with the nickel particle include a polypropylene resin, an epoxy resin, a polystyrene resin, a polyethylene resin, an ABS resin, a polycarbonate resin, and a polyethylene terephthalate resin, among which a polypropylene resin or an epoxy resin is preferable. The paste in which a nickel particle is dispersed in a resin is also available on the market and is commercially available, for example, as ECA202 (trade name, manufactured by Nihon Handa, Inc.) or EMTec NI41 (trade name, manufactured by Elminet, Inc.).

The form of the resin layer containing silver, which constitutes the resin film 21, is preferably one in which a silver particle is dispersed in the resin. The particle diameter of the silver particle is preferably 0.05 to 500 μm and more preferably 0.1 to 100 μm. Examples of the type of resin to be combined with the silver particle include a polypropylene resin, an epoxy resin, a polystyrene resin, a polyethylene resin, an ABS resin, a polycarbonate resin, and a polyethylene terephthalate resin, among which a polypropylene resin or an epoxy resin is preferable. The paste in which a silver particle is dispersed in a resin is also available on the market and is commercially available, for example, as LS-453-1 (trade name, manufactured by Asahi Chemical Research Laboratory Co., Ltd.), ECA-100 (trade name, manufactured by Nihon Handa, Inc.), or SCP-101 (trade name, manufactured by Shin-Etsu Silicone Co., Ltd.).

It is also preferable that the resin film 21 is a coating film. That is, it is also preferable that the resin film 21 is a film obtained by using a metal foil as a conductive layer, applying a paste in which a constituent material of the resin film is dissolved onto the metal foil, and drying the applied paste.

The safety of the battery, particularly the safety at the time of an internal short circuit can be effectively enhanced by including the resin film in the collector (Z1). The reason is considered as follows. In a case of a form having no resin film (support), the conductive layer is inevitably formed thick to some extent (for example, a metal foil is used). As a result, in a case where an internal short circuit occurs for some reason, a large amount of electrons are instantly supplied to an internal short circuit portion through the conductive layer (metal layer) of the collector, which is considered to cause thermal runaway. However, it is considered that the thermal runaway is suppressed in the collector (Z1) having a resin film as a support, since the metal layer is formed into a thin film by vapor deposition or the like, the amount of electrons supplied to the internal short circuit portion is restricted even in a case where an internal short circuit occurs. This is common to the action of the resin film on a bipolar collector (Z2) in a second embodiment which will be described later.

The thickness of the resin film can be appropriately set as long as the effect of the present invention is not impaired. For example, the thickness of the resin film can be 1 to 50 μm and is more preferably 2 to 40 82 m and still more preferably 3 to 35 μm.

In the present invention, the thickness of each layer such as the constituent layer of the non-aqueous electrolyte secondary battery and the constituent layer of the collector is a value obtained by measuring thicknesses at 100 random points in the cross-sectional observation (electron microscope observation) of each layer in a lamination direction, and then arithmetically averaging the measured values of those 100 points.

Conductive Layer

The conductive layer 22 is a layer exhibiting electron conductivity, and is usually composed of a metal material.

In a case where the collector (Z1) 20 is used as the positive electrode collector, the conductive layer 22 preferably contains aluminum, and is more preferably composed of aluminum or an aluminum alloy. In a case where the collector (Z1) 20 is a positive electrode collector, the conductive layer 22 may be configured to contain a metal material such as titanium, stainless steel, or nickel, or an alloy thereof.

In a case where the collector (Z1) 20 is used as the negative electrode collector, the conductive layer 22 preferably contains at least one of copper or nickel, and is more preferably composed of copper or a copper alloy, or nickel or a nickel alloy. In a case where the collector (Z1) 20 is used as the negative electrode collector, it is more preferable that the conductive layer 22 contains copper.

The conductive layer 22 is preferably formed into a thin layer by vapor deposition (preferably physical vapor deposition), sputtering, plating (preferably electroless plating), or the like. In addition, the conductive layer 22 can also be formed by disposing a metal foil such as a copper foil.

The thickness of the conductive layer 22 is preferably 10 to 5,000 nm. From the viewpoint of improving the cycle characteristics, the thickness of the conductive layer 22 is more preferably 20 to 3,000 nm, still more preferably 70 to 2,000 nm, even still more preferably 100 to 1,000 nm, further preferably 150 to 900 nm, further more preferably 200 to 800 nm, and even further more preferably 250 to 750 nm. In addition, in a case where the conductive layer 22 is formed of a metal foil, the thickness thereof is preferably 500 to 5,000 nm and more preferably 1,000 to 3,000 nm.

In a case where the conductive layer 22 is formed into a thin layer by vapor deposition (preferably physical vapor deposition), sputtering, plating (preferably electroless plating), or the like and then in a case where the thickness of the conductive layer of the negative electrode collector is constant, the cycle characteristics can be further enhanced by setting the thickness of the conductive layer 22 of the positive electrode collector to 150 to 900 nm (preferably 200 to 800 nm and more preferably 250 to 750 nm). Similarly, in a case where the thickness of the conductive layer of the positive electrode collector is constant, the cycle characteristics can be further enhanced by setting the thickness of the conductive layer 22 of the negative electrode collector to 150 to 900 nm (preferably 200 to 800 nm and more preferably 250 to 750 nm).

At least one surface of the conductive layer 22 can be roughened. For example, at least one surface of the conductive layer 22 can have a surface roughness Ra of 0.3 μm or more (in this case, the thickness of the conductive layer 22 is preferably 100 nm or more, more preferably 150 nm or more, and still more preferably 200 nm or more). This makes it possible to increase the contact area between the conductive layer 22 and the layer in contact with the conductive layer 22, and to further improve the adhesiveness, electron conductivity, and the like. This roughening method is not particularly limited, and the surface roughening can be achieved, for example, by embossing or sandblasting the surface of the resin film and providing thereon the conductive layer 22 in a thin layer by vapor deposition. In this case, the surface of the conductive layer 22 opposite to the resin film also has a shape that reflects the unevenness of the sandblasting treatment, so that both surfaces of the conductive layer 22 are in a state of being subjected to desired surface roughening. In a case where at least one surface of the conductive layer 22 is roughened, the surface roughness Ra of this surface is usually 5.0 μm or less, more preferably 3.0 μm or less, still more preferably 2.0 μm or less, and even still more preferably 1.5 μm or less.

The surface roughness Ra in the present invention is an arithmetic average roughness, and is determined based on JIS B0601 2001 with a reference length of 2.5 mm.

Contact Resistance Reducing Layer

The contact resistance reducing layer 23 plays a role of increasing electron conductivity. The conductive layer 22 constituting the collector (Z1) 20 is usually formed of a metal material as described above, and an oxide film occurs or a side reaction between a metal and an electrolyte occurs on the surface thereof. As a result, the adhesiveness between the conductive layer 22 and the electrode active material layer or the like, or the electron conductivity tends to decrease. By providing the contact resistance reducing layer 23 on the surface of such a conductive layer 22, it is possible to suppress or recover the above-mentioned decrease in adhesiveness or electron conductivity, and it is possible to improve the cycle characteristics.

As an example of the contact resistance reducing layer 23, there is a form of a layer containing a conductive substance. In this case, a layer containing at least one of conductive carbon, nickel, titanium, tantalum, or tungsten is preferable, a layer containing at least one of conductive carbon or nickel is more preferable, and a layer containing conductive carbon is still more preferable.

In a case where the contact resistance reducing layer 23 is a conductive carbon-containing layer, it is preferable to use graphite as the conductive carbon. In addition, the contact resistance reducing layer 23 may be formed by using a mixture of graphite and a binder, and it is also preferable to add conductive carbon such as acetylene black. In a case where the contact resistance reducing layer 23 is a conductive carbon-containing layer, the content of the conductive carbon in the contact resistance reducing layer 23 is preferably 30% by mass or more, more preferably 40% by mass or more, still more preferably 50% by mass or more, and even still more preferably 70% by mass or more. The remainder other than the conductive carbon is composed of the above binder or the like.

In a case where the contact resistance reducing layer 23 is a titanium-containing layer, corrosion can be effectively prevented due to high oxidation resistance of the titanium-containing layer. The titanium-containing layer can be formed by vapor deposition or the like of a titanium metal. In addition, the contact resistance reducing layer 23 may be formed by using an alloy containing titanium or a mixture of titanium and a binder. In a case where the contact resistance reducing layer 23 is a titanium-containing layer, the content of the titanium in the contact resistance reducing layer 23 is preferably 30% by mass or more, more preferably 40% by mass or more, still more preferably 50% by mass or more, and even still more preferably 70% by mass or more. The remainder other than the titanium is composed of the above binder or the like.

In a case where the contact resistance reducing layer 23 is a tantalum-containing layer, corrosion can be effectively prevented due to high oxidation resistance of the tantalum-containing layer. The tantalum-containing layer can be formed by vapor deposition or the like of a tantalum metal. In addition, the contact resistance reducing layer 23 may be formed by using an alloy containing tantalum or a mixture of tantalum and a binder. In a case where the contact resistance reducing layer 23 is a tantalum-containing layer, the content of the tantalum in the contact resistance reducing layer 23 is preferably 30% by mass or more, more preferably 40% by mass or more, still more preferably 50% by mass or more, and even still more preferably 70% by mass or more. The remainder other than the tantalum is composed of the above binder or the like.

In a case where the contact resistance reducing layer 23 is a tungsten-containing layer, corrosion can be effectively prevented due to high oxidation resistance of the tungsten-containing layer. The tungsten-containing layer can be formed by vapor deposition or the like of a tungsten metal.

In addition, the contact resistance reducing layer 23 may be formed by using a mixture of tungsten and a binder. In a case where the contact resistance reducing layer 23 is a tungsten-containing layer, the content of the tungsten in the contact resistance reducing layer 23 is preferably 30% by mass or more, more preferably 40% by mass or more, still more preferably 50% by mass or more, and even still more preferably 70% by mass or more. The remainder other than the tungsten is composed of the above binder or the like.

In a case where the contact resistance reducing layer 23 is a nickel-containing layer, corrosion can be effectively prevented due to high oxidation resistance of the nickel-containing layer. The nickel-containing layer can be formed by vapor deposition or the like of a nickel metal. In addition, the contact resistance reducing layer 23 may be formed by using a mixture of nickel and a binder. In a case where the contact resistance reducing layer 23 is a nickel-containing layer, the content of the nickel in the contact resistance reducing layer 23 is preferably 30% by mass or more, more preferably 40% by mass or more, still more preferably 50% by mass or more, and even still more preferably 70% by mass or more. The remainder other than the nickel is composed of the above binder or the like.

Explaining a preferred form of the contact resistance reducing layer of each collector of positive and negative electrodes, the contact resistance reducing layer 23 is preferably configured to contain conductive carbon in a case where the collector (Z1) 20 is used as the positive electrode collector.

In addition, in a case where the collector (Z1) 20 is used as the negative electrode collector, the contact resistance reducing layer 23 preferably contains at least one of conductive carbon, nickel, titanium, tantalum, or tungsten, and is preferably configured to contain conductive carbon. In addition, it is also preferable that the contact resistance reducing layer contains at least one of conductive carbon or nickel.

As another example of the contact resistance reducing layer 23, there is a form of a layer containing a rust preventive material (material having a rust preventive action) (also referred to as a rust preventive material-containing layer or a rust preventive layer). With such a form, the corrosion resistance of the surface of the contact resistance reducing layer 23 can be enhanced, and for example, the adhesiveness between the contact resistance reducing layer 23 and the electrode active material layer or the electron conductivity can be enhanced. As a result, it is possible to sufficiently improve the cycle characteristics.

Examples of the rust preventive material include benzotriazole compounds such as 1,2,3-benzotriazole, 1-[N,N-bis(2-ethylhexyl)aminomethyl]benzotriazole, carboxybenzotriazole, 1-[N,N-bis(2-ethylhexyl)aminomethyl]methylbenzotriazole, 2,2'-[[(methyl-1H-benzotriazol-1-yl)methyl]imino]bisethanol, and 1,2,3-benzotriazole sodium salts; phosphate compounds such as polyphosphate; silicate compounds such as metasilicate; and nitrite compounds such as calcium nitrite.

A collector in which the contact resistance reducing layer 23 contains a rust preventive material is preferable as a positive electrode collector and is also preferable as a negative electrode collector.

In a case where both the positive electrode collector and the negative electrode collector in the non-aqueous electrolyte secondary battery of the first embodiment are the collectors (Z1), the contact resistance reducing layer 23 of the positive electrode collector and the contact resistance reducing layer 23 of the negative electrode collector may be the same or different. For example, both the contact resistance reducing layer 23 of the positive electrode collector and the contact resistance reducing layer 23 of the negative electrode collector can be a conductive carbon layer or can be a rust preventive material-containing layer. In addition, it is also preferable that the contact resistance reducing layer 23 of the positive electrode collector is a conductive carbon layer and the contact resistance reducing layer 23 of the negative electrode collector is a rust preventive material-containing layer; or the contact resistance reducing layer 23 of the negative electrode collector is a conductive carbon layer and the contact resistance reducing layer 23 of the positive electrode collector is a rust preventive material-containing layer.

The method for forming the contact resistance reducing layer 23 is not particularly limited. For example, the contact resistance reducing layer 23 can be formed by preparing a coating liquid in which a target component is dissolved or dispersed in a solvent, forming a coating film formed of the coating liquid, and then drying the formed coating film. In addition, in a case where the contact resistance reducing layer 23 is formed of a metal, it can be formed by vapor deposition or plating as described above.

From the viewpoint of improving the cycle characteristics, the thickness of the contact resistance reducing layer 23 is preferably 10 to 3,000 nm, more preferably 20 to 2,000 nm, still more preferably 30 to 1,000 nm, even still more preferably 40 to 800 nm, and even still further more preferably 50 to 700 nm.

In particular, in a case where the contact resistance reducing layer is a conductive carbon-containing layer, the thickness of the contact resistance reducing layer 23 is preferably 60 nm or more, more preferably 80 nm or more, still more preferably 100 nm or more, even still more preferably 120 nm or more, even still further more preferably 150 nm or more, and even yet still more preferably 180 nm or more from the viewpoint of improving the cycle characteristics. In addition, the thickness of the contact resistance reducing layer 23, which is a conductive carbon-containing layer, is preferably 800 nm or less, more preferably 700 nm or less, still more preferably 600 nm or less, and even still more preferably 550 nm or less.

In addition, in a case where the contact resistance reducing layer 23 is a rust preventive layer, a sufficient effect tends to be obtained even in a case where the thickness of the contact resistance reducing layer 23 is 50 nm or less. The thickness of the contact resistance reducing layer 23, which is a rust preventive layer, is preferably 10 to 100 nm, more preferably 20 to 80 nm, and still more preferably 30 to 70 nm.

In the non-aqueous electrolyte secondary battery of the first embodiment, the above-mentioned collector (Z1) is disposed as at least one of the positive electrode collector or the negative electrode collector, and the others can be manufactured by a conventional method. In the non-aqueous electrolyte secondary battery of the first embodiment, in a case where the positive electrode collector or the negative electrode collector is not composed of the collector (Z1), there is no particular limitation on the configuration of the positive electrode collector or the negative electrode collector that is not the collector (Z1), and the one normally used as a collector for a non-aqueous electrolyte secondary battery can be widely applied.

From the viewpoint of further enhancing the safety of the non-aqueous electrolyte secondary battery, it is preferable that the positive electrode collector or the negative electrode collector, which is not the collector (Z1), has a resin film as a support. More preferably, the positive electrode collector or the negative electrode collector, which is not the collector (Z1), preferably has a configuration in which the contact resistance reducing layer is removed from the collector (Z1). That is, it is preferable to use a resin film as a support and to form the conductive layer into a thin layer (having, for example, a thickness of 5,000 nm or less, preferably a thickness of 2,000 nm or less, and more preferably a thickness of 1,500 nm or less) by vapor deposition or the like.

In a case where the positive electrode collector or the negative electrode collector, which is not the collector (Z1), contains a resin film, the preferred form of the resin film is the same as the preferred form of the resin film described in the collector (Z1). In addition, the preferred form of the conductive layer in the positive electrode collector or the negative electrode collector that is not the collector (Z1) is the same as the preferred form of the conductive layer described in the collector (Z1).

In a case where the positive electrode collector or the negative electrode collector, which is not the collector (Z1), has a configuration in which the contact resistance reducing layer is removed from the collector (Z1), it is preferable that at least one surface of the conductive layer is roughened. For example, at least one surface of the conductive layer can have a surface roughness Ra of 0.3 μm or more (in this case, the thickness of the conductive layer is preferably 100 nm or more, more preferably 150 nm or more, and still more preferably 200 nm or more). This makes it possible to increase the contact area between the conductive layer and the layer in contact with the conductive layer, and to further improve the adhesiveness, electron conductivity, and the like. This roughening method is not particularly limited, and the surface roughening can be achieved, for example, by sandblasting the surface of the resin film and providing thereon the conductive layer in a thin layer by vapor deposition. In this case, the surface of the conductive layer opposite to the resin film also has a shape that reflects the unevenness of the sandblasting treatment, so that both surfaces of the conductive layer are in a state of being subjected to desired surface roughening. In a case where at least one surface of the conductive layer is roughened, the surface roughness Ra of this surface is usually 5.0 μm or less, more preferably 3.0 μm or less, still more preferably 2.0 μm or less, and even still more preferably 1.5 μm or less.

In another preferred embodiment of the non-aqueous electrolyte secondary battery according to the embodiment of the present invention (hereinafter, also referred to as the second embodiment), the non-aqueous electrolyte secondary battery has a positive electrode, a negative electrode, and a bipolar electrode. The positive electrode has a positive electrode collector and a positive electrode active material layer in contact with the positive electrode collector, and the negative electrode has a negative electrode collector and a negative electrode active material layer in contact with the negative electrode collector. In addition, the bipolar electrode has a bipolar collector (Z2), a positive electrode active material layer in contact with one surface of the bipolar collector (Z2), and a negative electrode active material layer in contact with the other surface of the bipolar collector (Z2). The non-aqueous electrolyte secondary battery of the second embodiment has a structure in which the positive electrode is disposed on the negative electrode active material layer side of the bipolar electrode with a separator interposed therebetween and the negative electrode is disposed on the positive electrode active material layer side of the bipolar electrode with a separator interposed therebetween. The positive electrode active material layer and the negative electrode active material layer are each disposed toward the separator side and are disposed so as to face each other through the separator.

In the second embodiment, the bipolar collector (Z2) is a laminate having a resin film and a laminated structure of a conductive layer and a contact resistance reducing layer disposed on one or both surfaces of the resin film. More preferably, the bipolar collector (Z2) is a laminate having a resin film and a laminated structure of a conductive layer and a contact resistance reducing layer disposed on both surfaces of the resin film.

Figure 5:
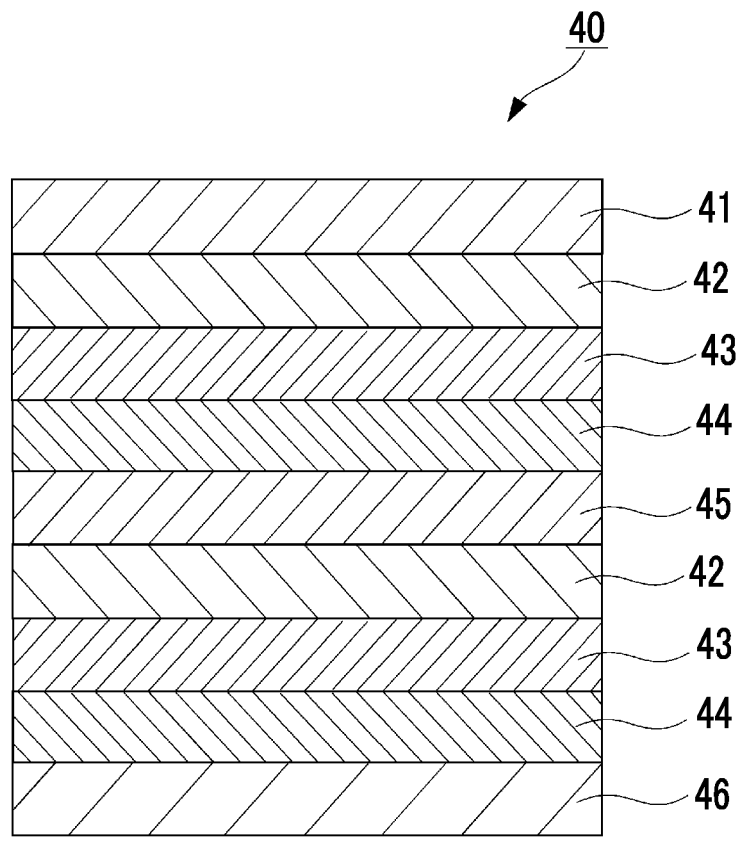
FIG. 5 is a vertical cross-sectional view schematically showing a basic laminated configuration of a bipolar type non-aqueous electrolyte secondary battery.

The laminated configuration of the non-aqueous electrolyte secondary battery of the second embodiment is schematically shown in FIG. 5. FIG. 5 shows a laminated configuration of a bipolar type non-aqueous electrolyte secondary battery.

A bipolar type laminate 40 shown in FIG. 5 includes a negative electrode collector 41, a negative electrode active material layer 42, a separator 43, a positive electrode active material layer 44, a bipolar collector 45, a negative electrode active material layer 42, a separator 43, a positive electrode active material layer 44, and a positive electrode collector 46 laminated in this order.

In the second embodiment, the configuration of a normal bipolar type non-aqueous electrolyte secondary battery can be adopted except for the configuration of the bipolar collector (Z2). The materials, electrolytes, members, and the like used in the non-aqueous electrolyte secondary battery of the second embodiment are not particularly limited except for the configuration of the bipolar collector (Z2). As these materials, members, and the like, those used for a normal non-aqueous electrolyte secondary battery can be appropriately applied. In addition, it is also preferable that at least one of the positive electrode collector or the negative electrode collector used in the second embodiment is the collector (Z1) described in the first embodiment. In addition, as for the method for preparing the non-aqueous electrolyte secondary battery according to the embodiment of the present invention, the usual method as described in the first embodiment may be appropriately adopted except for the configuration of the bipolar collector (Z2). In addition, regarding the technique of the bipolar type non-aqueous electrolyte secondary battery, for example, JP2013-110081A and the like can be appropriately referred to.

The bipolar collector (Z2), which is a characteristic configuration of the non-aqueous electrolyte secondary battery of the second embodiment, will be described below.

Bipolar Collector (Z2)

The bipolar collector (Z2) is a laminate having a resin film and a laminated structure of a conductive layer and a contact resistance reducing layer disposed on one or both surfaces of the resin film. In this respect, the bipolar collector (Z2) has the same structure as the collector (Z1) in the first embodiment. That is, in a case of referring to a "collector having a resin film and a laminated structure of a conductive layer and a contact resistance reducing layer disposed on one or both surfaces of the resin film" in the present invention, it means to include both the collector (Z1) and the bipolar collector (Z2).

Figure 6:
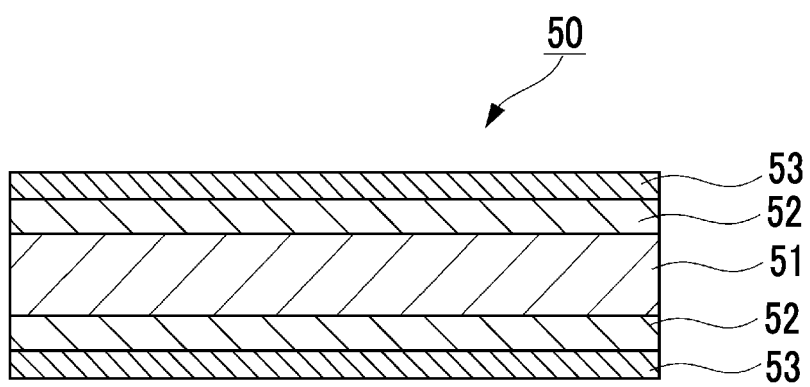
FIG. 6 is a vertical cross-sectional view schematically showing an embodiment of a laminated configuration of a collector of the present invention.

FIG. 6 shows a preferred form of the bipolar collector (Z2), in which the bipolar collector (Z2) has the above-mentioned laminated structures on both surfaces of the resin film and the resin film and the conductive layer are in contact with each other. It should be noted that FIG. 6 shows a preferred embodiment of the bipolar collector (Z2), and the bipolar collector (Z2) is not limited to the form shown in the drawings except as specified in the present invention. In addition, the laminated structure of the conductive layer and the contact resistance reducing layer shown in FIG. 6 may be disposed on only one surface of the resin film.

A bipolar collector (Z2) 50 shown in FIG. 6 has a resin film 51 as a support, and has a conductive layer 52 and a contact resistance reducing layer 53 in this order on both surfaces of the resin film 51. The configurations of the resin film and the conductive layer in the second embodiment will be described with reference to FIG. 6, but the configurations of the resin film and the conductive layer described below are preferably applied to the second embodiment other than that shown FIG. 6. In addition, as the configuration of the bipolar collector (Z2) 50 other than that described below, the form described in the collector (Z1) in the first embodiment is preferably applied. For example, as the form of the contact resistance reducing layer of the bipolar collector (Z2) 50, the form of the contact resistance reducing layer described in the collector (Z1) is preferably applied. The contact resistance reducing layer of the bipolar collector (Z2) 50 preferably contains the above-mentioned rust preventive material or conductive carbon.

Resin Film

The constituent material (resin) of the resin film 51 is not particularly limited. The form (constituent material, layer configuration, thickness, or the like) of the resin film 21 constituting the collector (Z1) of the first embodiment can be preferably applied as the form of the resin film 51, but the resin film 51 is preferably a film containing a conductive material since it is necessary to have conductivity in the thickness direction of the film. Above all, the resin film 51 preferably has a resin layer containing at least one of elemental carbon, gold, nickel, or silver. In a case where the resin film 51 has a resin layer containing at least one of elemental carbon, gold, nickel, or silver, it is more preferable that the resin film 51 is composed of one resin layer containing at least one of elemental carbon, gold, nickel, or silver.

Conductive Layer

The conductive layer 52 is a layer exhibiting electron conductivity, and is usually composed of a metal material. In a case where the conductive layer 52 is disposed on the positive electrode active material layer side constituting the bipolar electrode, it is preferable that the conductive layer 52 contains at least one of aluminum or nickel from the viewpoint of oxidation resistance. These aluminum and nickel can be fixed to the surface of the resin film 51 by vapor deposition or the like.

In addition, the conductive layer 52 disposed on the negative electrode active material layer side constituting the bipolar electrode is preferably a copper foil from the viewpoint of reduction resistance. Therefore, it is also preferable that the conductive layer 52 disposed on the positive electrode active material layer side constituting the bipolar electrode is thick to some extent. For example, the thickness of the conductive layer 52 disposed on the positive electrode active material layer side is preferably 20 to 3,000 nm, more preferably 50 to 3,000 nm, and still more preferably 100 to 2,500 nm.

As described above, in a case where the bipolar collector (Z2) has laminated structures of a conductive layer and a contact resistance reducing layer on both surfaces, it is preferable that the conductive layers constituting both laminated structures are composed of different materials.

The non-aqueous electrolyte secondary battery according to the embodiment of the present invention can be mounted on an electronic apparatus such as a notebook computer, a pen input computer, a mobile computer, an electronic book player, a cellular phone, a cordless phone handset, a pager, a handy terminal, a portable fax, a portable copier, a portable printer, a stereo headphone, a video movie player, a liquid crystal display TV, a handy cleaner, a portable CD player, a mini disc player, an electric shaver, a transceiver, an electronic organizer, a calculator, a memory card, a portable tape recorder, a radio, or a backup power supply. In addition, for consumer use, the non-aqueous electrolyte secondary battery according to the embodiment of the present invention can be mounted on an automobile, an electric vehicle, a motor, a lighting instrument, a toy, a game instrument, a road conditioner, a watch, a strobe, a camera, or a medical instrument (a pacemaker, a hearing aid, a shoulder massage machine, or the like). Furthermore, the non-aqueous electrolyte secondary battery according to the embodiment of the present invention can be used for various military needs and space use. In addition, the non-aqueous electrolyte secondary battery according to the embodiment of the present invention can also be combined with a solar battery.

Hereinafter, the present invention will be described in more detail based on examples. It should be noted that the present invention is not limited thereto.

EXAMPLES

Example 1

Preparation of Non-Aqueous Electrolytic Solution

A non-aqueous electrolytic solution was prepared by dissolving $LiPF_6$ as a lithium salt in a non-aqueous solvent consisting of 40 parts by mass of ethylene carbonate and 60 parts by mass of ethyl methyl carbonate so as to have a concentration of 1 M.

Preparation of Slurry for Forming Positive Electrode Active Material Layer

A slurry (medium: N-methylpyrrolidone) containing 85 parts by mass of $LiNi_{0.5}Co_{0.2}Mn_{0.3}O_2$ (NCM523) as a positive electrode active material, 7 parts by mass of acetylene black as a conductive auxiliary agent, and 8 parts by mass of polyvinylidene fluoride (PVDF) as a binder was prepared and used as a slurry for forming a positive electrode active material layer.

Preparation of Slurry for Forming Negative Electrode Active Material Layer

A slurry (medium: water) containing 92 parts by mass of artificial graphite as a negative electrode active material and 8 parts by mass of PVDF as a binder was prepared and used as a slurry for forming a negative electrode active material layer.

Separator

A polypropylene separator (void volume: 35%, film thickness: 20 μm) was used.

Preparation of Slurry for Forming Conductive Carbon Layer

A slurry (medium: mesitylene) containing 10 parts by mass of natural graphite, 2 parts by mass of acetylene black, and 2 parts by mass of PVDF was prepared and used as a slurry for forming a conductive carbon layer.

Preparation of Non-Aqueous Electrolyte Secondary Battery

A sheet type non-aqueous electrolyte secondary battery having a laminated structure shown in FIG. 1 was prepared as follows.

Preparation of Positive Electrode Collector

A polyethylene terephthalate (PET) film having a thickness of 12 μm was used as a resin film, and aluminum was vapor-deposited on the film to form a conductive layer having a thickness of 300 nm.

The slurry for forming a conductive carbon layer was applied onto the aluminum conductive layer and dried to form a conductive carbon layer (contact resistance reducing layer) having a thickness of 200 nm. In this manner, a positive electrode collector was obtained.

Preparation of Positive Electrode

The slurry for forming a positive electrode active material layer was applied onto the conductive carbon layer of the positive electrode collector obtained above and dried to form a positive electrode active material layer having a thickness of 80 μm to thereby obtain a positive electrode.

Preparation of Negative Electrode Collector

A PET film having a thickness of 12 μm was used as a resin film, and copper was vapor-deposited on the film to form a conductive layer having a thickness of 300 nm. In this manner, a negative electrode collector was obtained.

Preparation of Negative Electrode

The slurry for forming a negative electrode active material layer was applied onto the conductive layer of the negative electrode collector obtained above and dried to form a negative electrode active material layer having a thickness of 80 μm to thereby obtain a negative electrode.

Preparation of Non-Aqueous Electrolyte Secondary Battery

The obtained positive electrode and negative electrode were laminated through the separator such that the positive electrode active material layer and the negative electrode active material layer are each disposed toward the separator side. A wiring line (tab) was connected to the conductive layer of each collector, the wiring line was pulled out to the outside, and then the electrolytic solution was enclosed using a resin film to obtain a non-aqueous electrolyte secondary battery. The obtained non-aqueous electrolyte secondary battery was charged and discharged three times at 25° C. by charge at a current value of 30 mA and a final voltage of 4.2 V and then discharge at a current value of 30 mA and a final voltage of 3.0 V. In this manner, a sheet type non-aqueous electrolyte secondary battery having a capacity of 300 mAh was obtained.

Example 2

A sheet type non-aqueous electrolyte secondary battery having a capacity of 300 mAh was obtained in the same manner as in Example 1 except that, in the preparation of the negative electrode collector of Example 1, the slurry for forming a conductive carbon layer was applied onto the conductive layer (copper deposition layer) and dried to form a conductive carbon layer having a thickness of 200 nm.

Example 3

A sheet type non-aqueous electrolyte secondary battery having a capacity of 300 mAh was obtained in the same manner as in Example 1 except that, in the preparation of the negative electrode collector of Example 1, an ethanol solution prepared by dissolving 1,2,3-benzotriazole at a concentration of 2% by mass was applied onto the conductive layer (copper deposition layer) and dried to form a rust preventive layer having a thickness of 50 nm.

Example 4

A sheet type non-aqueous electrolyte secondary battery having a capacity of 300 mAh was obtained in the same manner as in Example 1 except that, in the preparation of the negative electrode collector of Example 1, an ethanol solution prepared by dissolving 1,2,3-benzotriazole at a concentration of 2% by mass was applied onto the conductive layer (copper deposition layer) and dried to form a rust preventive layer having a thickness of 150 nm.

Example 5

A sheet type non-aqueous electrolyte secondary battery having a capacity of 300 mAh was obtained in the same manner as in Example 1 except that, in the preparation of the positive electrode collector of Example 1, an ethanol solution prepared by dissolving 1,2,3-benzotriazole at a concentration of 2% by mass was used instead of the slurry for forming a conductive carbon layer to form a rust preventive layer having a thickness of 50 nm.

Example 6

A sheet type non-aqueous electrolyte secondary battery having a capacity of 300 mAh was obtained in the same manner as in Example 5 except that, in the preparation of the negative electrode collector of Example 5, the surface of the PET film was subjected to a sandblasting treatment and copper was vapor-deposited on the thus-treated surface to form a conductive layer having a thickness of 300 nm. Both surfaces of the conductive layer had an Ra of 0.4 μm.

Example 7

A sheet type non-aqueous electrolyte secondary battery having a capacity of 300 mAh was obtained in the same manner as in Example 5 except that, in the preparation of the negative electrode collector of Example 5, the surface of the PET film was subjected to a sandblasting treatment and copper was vapor-deposited on the thus-treated surface to form a conductive layer having a thickness of 300 nm. Both surfaces of the conductive layer had an Ra of 1.0 μm.

Example 8, Example 9, Example 10, and Example 11

A sheet type non-aqueous electrolyte secondary battery having a capacity of 300 mAh was obtained in the same manner as in Example 1 except that, in the preparation of the positive electrode collector of Example 1, the thickness of the conductive carbon layer was as shown in the table which will be given later.

Example 12, Example 13, Example 14, and Example 15

A sheet type non-aqueous electrolyte secondary battery having a capacity of 300 mAh was obtained in the same manner as in Example 1 except that, in the preparation of the positive electrode collector of Example 1, the thickness of the conductive layer (aluminum deposition layer) was as shown in the table which will be given later.

Example 16 and Example 17

A sheet type non-aqueous electrolyte secondary battery having a capacity of 300 mAh was obtained in the same manner as in Example 1 except that, in the preparation of the positive electrode collector of Example 1, the thickness of the PET film was as shown in the table which will be given later.

Example 18

A sheet type non-aqueous electrolyte secondary battery having a capacity of 300 mAh was obtained in the same manner as in Example 1 except that, in the preparation of the positive electrode collector of Example 1, a polyethylene (PE) film having a thickness of 20 lam was used instead of the PET film having a thickness of 12 μm.

Comparative Example 1

A sheet type non-aqueous electrolyte secondary battery having a capacity of 300 mAh was obtained in the same manner as in Example 1 except that the conductive carbon layer was not formed in the preparation of the positive electrode collector of Example 1.

Comparative Example 2

A sheet type non-aqueous electrolyte secondary battery having a capacity of 300 mAh was obtained in the same manner as in Example 1 except that, in the preparation of the positive electrode collector of Example 1, the slurry for forming a conductive carbon layer was applied onto an aluminum foil having a thickness of 20 μm without using a resin film and dried to form a conductive carbon layer having a thickness of 300 nm.

[Test Example 1] Cycle Characteristics Test

Using each of the non-aqueous electrolyte secondary batteries prepared above, constant current charge was carried out at a current value of 30 mA and a final voltage of 4.2 V in an environment of 25° C., and then constant voltage charge was carried out at a final current value of 3 mA.

Then, constant current discharge was carried out at a current value of 300 mA and a final voltage of 3.0 V.

The discharge capacity retention rate (%) after 100 cycles was investigated with the above-mentioned one charge and one discharge as one cycle, and evaluated by application thereof to the following evaluation standards. The discharge capacity retention rate (%) is determined by the following expression.

Discharge capacity retention rate (%)=100×[discharge capacity in 100th cycle]/[discharge capacity in 1st cycle]

Evaluation Standards for Cycle Characteristics

S: The discharge capacity retention rate is 95% or more
A: The discharge capacity retention rate is 93% or more and less than 95%
B: The discharge capacity retention rate is 90% or more and less than 93%
C: The discharge capacity retention rate is 85% or more and less than 90%
D: The discharge capacity retention rate is less than 85%

The results are shown in the table which will be given later.

[Test Example 2] Safety Test (Nail Penetration Test)

Using each of the non-aqueous electrolyte secondary batteries prepared above, a nail penetration test was carried out in a fully charged state (SOC 100%), and evaluation was carried out by applying the test results to the following evaluation standards. This nail penetration test is a test in which a nail is penetrated into a battery to forcibly cause an internal short circuit.

Evaluation Standards for Nail Penetration Test

A: The battery did not ignite and did not smoke.
B: The battery did not ignite and smoked.
C: The battery ignited.

The results are shown in the table which will be given later.

TABLE 1

| | Positive electrode collector | | | | | | Negative electrode collector |
|---|---|---|---|---|---|---|---|
| | Resin film | | Conductive layer | | | Contact resistance reducing layer | |
| | Type | Thickness (μm) | Type | Thickness (nm) | Ra (μm) | Type | Thickness (nm) | Resin film Type |
| Example 1 | PET | 12 | Al vapor-deposited | 300 | 0.25 | Conductive carbon | 200 | PET |
| Example 2 | PET | 12 | Al vapor-deposited | 300 | 0.25 | Conductive carbon | 200 | PET |
| Example 3 | PET | 12 | Al vapor-deposited | 300 | 0.25 | Conductive carbon | 200 | PET |
| Example 4 | PET | 12 | Al vapor-deposited | 300 | 0.25 | Conductive carbon | 200 | PET |
| Example 5 | PET | 12 | Al vapor-deposited | 300 | 0.25 | Rust preventive | 50 | PET |
| Example 6 | PET | 12 | Al vapor-deposited | 300 | 0.25 | Rust preventive | 50 | PET |
| Example 7 | PET | 12 | Al vapor-deposited | 300 | 0.25 | Rust preventive | 50 | PET |
| Example 8 | PET | 12 | Al vapor-deposited | 300 | 0.25 | Conductive carbon | 500 | PET |
| Example 9 | PET | 12 | Al vapor-deposited | 300 | 0.25 | Conductive carbon | 1,000 | PET |
| Example 10 | PET | 12 | Al vapor-deposited | 300 | 0.25 | Conductive carbon | 50 | PET |
| Example 11 | PET | 12 | Al vapor-deposited | 300 | 0.25 | Conductive carbon | 100 | PET |
| Example 12 | PET | 12 | Al vapor-deposited | 700 | 0.25 | Conductive carbon | 200 | PET |
| Example 13 | PET | 12 | Al vapor-deposited | 1,000 | 0.25 | Conductive carbon | 200 | PET |
| Example 14 | PET | 12 | Al vapor-deposited | 2,500 | 0.25 | Conductive carbon | 200 | PET |

TABLE 1-continued

| | | | | | | | | | |
|---|---|---|---|---|---|---|---|---|---|
| Example 15 | PET | 12 | Al vapor-deposited | 50 | 0.25 | Conductive carbon | 200 | | PET |
| Example 16 | PET | 5 | Al vapor-deposited | 300 | 0.25 | Conductive carbon | 200 | | PET |
| Example 17 | PET | 24 | Al vapor-deposited | 300 | 0.25 | Conductive carbon | 200 | | PET |
| Example 18 | PE | 20 | Al vapor-deposited | 300 | 0.25 | Conductive carbon | 200 | | PET |
| Comparative Example 1 | PET | 12 | Al vapor-deposited | 300 | 0.25 | None | — | | PET |
| Comparative Example 2 | None | — | Al foil | 20,000 | 0.25 | Conductive carbon | 200 | | PET |

| | Negative electrode collector | | | | | | | |
|---|---|---|---|---|---|---|---|---|
| | Resin film | | Conductive layer | | | Contact resistance reducing layer | | |
| | Thickness (μm) | | Thickness (nm) | Ra (μm) | | Thickness (nm) | Cycle characteristics | Safety |
| | | Type | | | Type | | | |
| Example 1 | 12 | Cu vapor-deposited | 300 | 0.25 | None | — | A | A |
| Example 2 | 12 | Cu vapor-deposited | 300 | 0.25 | Conductive carbon | 200 | S | A |
| Example 3 | 12 | Cu vapor-deposited | 300 | 0.25 | Rust preventive | 50 | S | A |
| Example 4 | 12 | Cu vapor-deposited | 300 | 0.25 | Rust preventive | 150 | B | A |
| Example 5 | 12 | Cu vapor-deposited | 300 | 0.25 | None | — | A | A |
| Example 6 | 12 | Cu vapor-deposited | 300 | 0.4 | None | — | S | A |
| Example 7 | 12 | Cu vapor-deposited | 300 | 1.0 | None | — | S | A |
| Example 8 | 12 | Cu vapor-deposited | 300 | 0.25 | None | — | A | A |
| Example 9 | 12 | Cu vapor-deposited | 300 | 0.25 | None | — | B | A |
| Example 10 | 12 | Cu vapor-deposited | 300 | 0.25 | None | — | C | A |
| Example 11 | 12 | Cu vapor-deposited | 300 | 0.25 | None | — | B | A |
| Example 12 | 12 | Cu vapor-deposited | 300 | 0.25 | None | — | A | A |
| Example 13 | 12 | Cu vapor-deposited | 300 | 0.25 | None | — | B | A |
| Example 14 | 12 | Cu vapor-deposited | 300 | 0.25 | None | — | B | B |
| Example 15 | 12 | Cu vapor-deposited | 300 | 0.25 | None | — | C | A |
| Example 16 | 12 | Cu vapor-deposited | 300 | 0.25 | None | — | A | B |
| Example 17 | 12 | Cu vapor-deposited | 300 | 0.25 | None | — | A | A |
| Example 18 | 12 | Cu vapor-deposited | 300 | 0.25 | None | — | A | A |

TABLE 1-continued

| | | | | | | | | |
|---|---|---|---|---|---|---|---|---|
| Comparative Example 1 | 12 | Cu vapor-deposited | 300 | 0.25 | None | — | D | A |
| Comparative Example 2 | 12 | Cu vapor-deposited | 300 | 0.25 | None | — | C | C |

As shown in the above table, in a case where both the positive electrode collector and the negative electrode collector did not have the contact resistance reducing layer, the obtained non-aqueous electrolyte secondary battery was significantly inferior in cycle characteristics (Comparative Example 1).

In addition, in a case where the positive electrode collector did not have a resin film and therefore the conductive layer was formed thick, the obtained non-aqueous electrolyte secondary battery could not sufficiently suppress thermal runaway in a case where an internal short circuit occurred (Comparative Example 2).

On the other hand, all of the non-aqueous electrolyte secondary batteries having the collector specified in the present invention exhibited excellent cycle characteristics and excellent safety (Examples 1 to 18).

Example 19

A non-aqueous electrolytic solution, a slurry for forming a positive electrode active material layer, a slurry for forming a negative electrode active material layer, and a separator were prepared in the same manner as in Example 1.

Preparation of Monopolar Type Non-Aqueous Electrolyte Secondary Battery

A monopolar type non-aqueous electrolyte secondary battery having a laminated structure shown in FIG. 3 was prepared as follows.

Preparation of Positive Electrode Collector

A PET film having a thickness of 12 μm was used as the resin film, and aluminum was vapor-deposited on both surfaces of the film to form conductive layers having a thickness of 300 nm on both surfaces of the PET film.

Using an ethanol solution prepared by dissolving 1,2,3-benzotriazole at a concentration of 2% by mass, a rust preventive layer having a thickness of 50 nm was formed on each of the aluminum conductive layers on both surfaces. In this manner, a positive electrode collector having laminated structures of a conductive layer and a contact resistance reducing layer (rust preventive layer) on both surfaces of the resin film was obtained.

Preparation of Positive Electrode

The slurry for forming a positive electrode active material layer was applied onto each of the rust preventive layers on both surfaces of the positive electrode collector obtained above, and dried to form positive electrode active material layers having a thickness of 80 μm, whereby a positive electrode having positive electrode active material layers on both surfaces of the positive electrode collector was obtained.

Preparation of Negative Electrode Collector

A PET film having a thickness of 12 μm was used as a resin film, and copper was vapor-deposited on the film to form a conductive layer having a thickness of 300 nm. In this manner, a negative electrode collector was obtained.

Two identical negative electrode collectors were prepared.

Preparation of Negative Electrode

The slurry for forming a negative electrode active material layer was applied onto the conductive layer of the negative electrode collector obtained above and dried to form a negative electrode active material layer having a thickness of 80 μm to thereby obtain a negative electrode.

Two identical negative electrodes were prepared.

Preparation of Monopolar Type Non-Aqueous Electrolyte Secondary Battery

Each of the two obtained negative electrodes was laminated through a separator on each of the two positive electrode active material layers constituting both surfaces of the obtained positive electrode with the negative electrode active material layer side facing the separator side. A wiring line (tab) was connected to the conductive layer of each collector, the wiring line was pulled out to the outside, and then the electrolytic solution was enclosed using a resin film to obtain a non-aqueous electrolyte secondary battery. The obtained non-aqueous electrolyte secondary battery was charged and discharged three times at 25° C. by charge at a current value of 60 mA and a final voltage of 4.2 V and then discharge at a current value of 60 mA and a final voltage of 3.0 V. In this manner, a monopolar type non-aqueous electrolyte secondary battery having a capacity of 600 mAh was obtained.

Example 20

A non-aqueous electrolytic solution, a slurry for forming a positive electrode active material layer, a slurry for forming a negative electrode active material layer, and a separator were prepared in the same manner as in Example 1.

Preparation of Monopolar Type Non-Aqueous Electrolyte Secondary Battery

A monopolar type non-aqueous electrolyte secondary battery having a laminated structure shown in FIG. 4 was prepared as follows.

Preparation of Negative Electrode Collector

A PET film having a thickness of 12 μm was used as the resin film, and copper was vapor-deposited on both surfaces of the film to form conductive layers having a thickness of 300 nm on both surfaces of the film.

Using an ethanol solution prepared by dissolving 1,2,3-benzotriazole at a concentration of 2% by mass, a rust preventive layer having a thickness of 50 nm was formed on each of the copper conductive layers on both surfaces. In this manner, a negative electrode collector having a laminated structure of a conductive layer and a contact resistance reducing layer (rust preventive layer) on both surfaces of the resin film was obtained.

Preparation of Negative Electrode

The slurry for forming a negative electrode active material layer was applied onto each of the rust preventive layers on both surfaces of the negative electrode collector obtained above, and dried to form negative electrode active material layers having a thickness of 80 μm, whereby a negative electrode having negative electrode active material layers on both surfaces of the negative electrode collector was obtained.

Preparation of Positive Electrode Collector

A PET film having a thickness of 12 μm was used as a resin film, and aluminum was vapor-deposited on the film to form a conductive layer having a thickness of 300 nm. In this manner, a positive electrode collector was obtained.

Two identical positive electrode collectors were prepared.

Preparation of Positive Electrode

The slurry for forming a positive electrode active material layer was applied onto the conductive layer of the positive electrode collector obtained above and dried to form a positive electrode active material layer having a thickness of 80 μm to thereby obtain a positive electrode.

Two identical positive electrodes were prepared.

Preparation of Monopolar Type Non-Aqueous Electrolyte Secondary Battery

Each of the two obtained positive electrodes was laminated through a separator on each of the two negative electrode active material layers constituting both surfaces of the obtained negative electrode with the positive electrode active material layer side facing the separator side. A wiring line (tab) was connected to the conductive layer of each collector, the wiring line was pulled out to the outside, and then the electrolytic solution was enclosed using a resin film to obtain a non-aqueous electrolyte secondary battery. The obtained non-aqueous electrolyte secondary battery was charged and discharged three times at 25° C. by charge at a current value of 60 mA and a final voltage of 4.2 V and then discharge at a current value of 60 mA and a final voltage of 3.0 V. In this manner, a monopolar type non-aqueous electrolyte secondary battery having a capacity of 600 mAh was obtained.

Example 21

A monopolar type non-aqueous electrolyte secondary battery was obtained in the same manner as in Example 19 except that, in Example 19, a carbon resin (C resin) film (molded product) having a thickness of 85 μm was used instead of the PET film having a thickness of 12 μm as the resin film constituting the positive electrode collector.

The "carbon resin film (molded product)" was prepared as follows.

In a twin-screw extruder, 75% by mass of polypropylene (PP) (trade name: "SUNALLOMER PL500A", manufactured by SunAllomer Ltd.), 20% by mass of acetylene black (AB) (trade name: "DENKA BLACK HS-100", manufactured by Denka Company Limited), and 5% by mass of a dispersant (trade name: "ADMER QE800", manufactured by Mitsui Chemicals, Inc.) were melt-kneaded under the conditions of 180° C., 100 rpm, and a retention time of 10 minutes to obtain a material for a collector. The obtained material for a collector was rolled by a hot press to obtain a carbon-containing resin film having a thickness of 85 μm.

Example 22

A monopolar type non-aqueous electrolyte secondary battery was obtained in the same manner as in Example 21 except that, in Example 21, the preparation of the positive electrode collector was changed as follows.

Preparation of Positive Electrode Collector

A carbon-containing resin film having a thickness of 85 μm was obtained in the same manner as in Example 21. Further, an aluminum foil having a thickness of 10 μm was laminated on the carbon-containing resin film which was then treated by a hot roll press to obtain a carbon-containing resin film/aluminum foil laminate. Further, aluminum was vapor-deposited on the other surface of the carbon-containing resin film to form a conductive layer having a thickness of 300 nm. Using an ethanol solution prepared by dissolving 1,2,3-benzotriazole at a concentration of 2% by mass, a rust preventive layer having a thickness of 50 nm was formed on each of the conductive layer and the aluminum foil to obtain a positive electrode collector.

Example 23

A monopolar type non-aqueous electrolyte secondary battery was obtained in the same manner as in Example 22 except that, in Example 22, the preparation of the positive electrode collector was changed as follows.

Preparation of Positive Electrode Collector 7 parts by mass of a liquid epoxy resin [CELLOXIDE 2021P (alicyclic epoxy resin; manufactured by Daicel Corporation)], 15 parts by mass of a polyfunctional epoxy resin [MARPROOF G2050M (manufactured by NOF Corporation)], 5 parts by mass of acetylene black, and 0.5 parts by mass of a curing agent [SAN AID SI-60 (manufactured by Sanshin Chemical Industry Co., Ltd.)] were mixed to prepare a paste (medium: mesitylene) containing a carbon resin.

The paste containing a carbon resin was applied onto an aluminum foil and dried to form a carbon resin film (coating film) having a thickness of 85 μm. Next, aluminum was vapor-deposited on the side of the carbon resin film opposite to the side having the aluminum foil to form a conductive layer having a thickness of 300 nm. Using an ethanol solution prepared by dissolving 1,2,3-benzotriazole at a concentration of 2% by mass, a rust preventive layer having a thickness of 50 nm was formed on each of the aluminum conductive layers (foil and vapor-deposited film) on both surfaces. In this manner, a positive electrode collector having laminated structures of a conductive layer and a contact resistance reducing layer (rust preventive layer) on both surfaces of the resin film was obtained.

Example 24

A monopolar type non-aqueous electrolyte secondary battery was obtained in the same manner as in Example 23 except that, in Example 23, the thickness of the carbon resin film (coating film) constituting the positive electrode collector was 20 μm.

Example 25

A monopolar type non-aqueous electrolyte secondary battery was obtained in the same manner as in Example 20 except that, in Example 20, the carbon resin film (molded product) having a thickness of 85 μm of Example 21 was used instead of the PET film having a thickness of 12 μmas the resin film constituting the negative electrode collector.

Example 26

A monopolar type non-aqueous electrolyte secondary battery was obtained in the same manner as in Example 25 except that, in Example 25, the preparation of the negative electrode collector was changed as follows.

Preparation of Negative Electrode Collector

The carbon resin film (molded product) having a thickness of 85 μm of Example 21 and a copper foil having a thickness of 10 μm were laminated and the resulting structure was treated by a hot roll press to obtain a carbon resin film/copper foil laminate. Further, copper was vapor-deposited on the other surface of the carbon resin film to form a conductive layer having a thickness of 300 nm. Using an ethanol solution prepared by dissolving 1,2,3-benzotriazole at a concentration of 2% by mass, a rust preventive layer having a thickness of 50 nm was formed on each of the conductive layer and the copper foil to obtain a negative electrode collector.

Example 27

A monopolar type non-aqueous electrolyte secondary battery was obtained in the same manner as in Example 26 except that, in Example 26, the preparation of the negative electrode collector was changed as follows.

Preparation of Negative Electrode Collector

The carbon resin film (molded product) having a thickness of 85 μm of Example 21 and a copper foil MT18FL with a carrier (manufactured by Mitsui Mining & Smelting Co., Ltd.) of copper foil (2 μm)/carrier copper foil (18 μm) were laminated and the resulting structure was treated by a hot roll press to obtain a carbon resin film (85 μm)/copper foil (2 μm)/carrier copper foil (18 μm) laminate. Further, copper was vapor-deposited on the surface of the carbon resin film opposite to the surface having the copper foil to form a conductive layer having a thickness of 300 nm. Then, the carrier copper foil was peeled off to obtain a copper vapor-deposited film (300 nm)/carbon resin film (85 μm)/copper foil (2 μm) laminate. Using an ethanol solution prepared by dissolving 1,2,3-benzotriazole at a concentration of 2% by mass, a rust preventive layer having a thickness of 50 nm was formed on each of the copper conductive layers (foil and vapor-deposited film) on both surfaces. In this manner, a negative electrode collector having a laminated structure of a conductive layer and a contact resistance reducing layer (rust preventive layer) on both surfaces of the resin film was obtained.

Example 28

A monopolar type non-aqueous electrolyte secondary battery was obtained in the same manner as in Example 27 except that, in Example 27, the preparation of the negative electrode collector was changed as follows.

Preparation of Negative Electrode Collector

The paste containing a carbon resin of Example 23 was applied onto a copper foil MT18FL with a carrier (manufactured by Mitsui Mining & Smelting Co., Ltd.) of copper foil (2 μm)/carrier copper foil (18 μm) and dried to form a carbon resin film (coating film) having a thickness of 85 μm on the copper foil. Next, copper was vapor-deposited on the side of the carbon resin film opposite to the side having the copper foil to form a conductive layer having a thickness of 300 nm. Thereafter, the carrier copper foil was peeled off to obtain a copper vapor-deposited film (300 nm)/carbon resin film (85 μm)/copper foil (2 μm) laminate. Using an ethanol solution prepared by dissolving 1,2,3-benzotriazole at a concentration of 2% by mass, a rust preventive layer having a thickness of 50 nm was formed on each of the copper conductive layers (foil and vapor-deposited film) on both surfaces. In this manner, a negative electrode collector having a laminated structure of a conductive layer and a contact resistance reducing layer (rust preventive layer) on both surfaces of the resin film was obtained.

Example 29

A monopolar type non-aqueous electrolyte secondary battery was obtained in the same manner as in Example 28 except that, in Example 28, the thickness of the carbon resin film (coating film) constituting the negative electrode collector was 20 μm.

Comparative Example 3

A monopolar type non-aqueous electrolyte secondary battery having a capacity of 600 mAh was obtained in the same manner as in Example 19 except that, in the preparation of the positive electrode collector of Example 19, the same slurry for forming a conductive carbon layer as used in Example 1 was applied onto both surfaces of an aluminum foil having a thickness of 20 μm without using a resin film and dried to form a conductive carbon layer having a thickness of 200 nm.

For the sake of convenience, Al foil and 20,000 nm are described in both the front and back columns of the positive electrode collector in the column of Comparative Example 3 in Table 2, but only one aluminum foil was used as described above.

Using each of the monopolar type non-aqueous electrolyte secondary batteries prepared above, the cycle characteristics and safety were evaluated as follows. The results are shown in the table which will be given later.

[Test Example 3] Cycle Characteristics Test

Using the monopolar type non-aqueous electrolyte secondary batteries prepared above, constant current charge was carried out at a current value of 60 mA and a final voltage of 4.2 V in an environment of 25° C., and then constant voltage charge was carried out at a final current value of 6 mA.

Then, constant current discharge was carried out at a current value of 600 mA and a final voltage of 3.0 V.

The discharge capacity retention rate (%) after 100 cycles was investigated with the above-mentioned one charge and one discharge as one cycle, and evaluated by application thereof to the following evaluation standards in the same manner as in Test Example 1. The discharge capacity retention rate (%) is determined by the following expression.

Discharge capacity retention rate (%)=100×[discharge capacity in 100th cycle]/[discharge capacity in 1st cycle]

Evaluation Standards for Cycle Characteristics

S: The discharge capacity retention rate is 95% or more
A: The discharge capacity retention rate is 93% or more and less than 95%
B: The discharge capacity retention rate is 90% or more and less than 93%
C: The discharge capacity retention rate is 85% or more and less than 90%
D: The discharge capacity retention rate is less than 85%

The results are shown in the table which will be given later.

[Test Example 4] Safety Test (Nail Penetration Test)

Similar to Test Example 2, a nail penetration test was carried out in a fully charged state (SOC 100%) using the monopolar type non-aqueous electrolyte secondary batteries prepared above, and evaluation was carried out by applying the test results to the following evaluation standards. This nail penetration test is a test in which a nail is penetrated into a battery to forcibly cause an internal short circuit.

Evaluation Standards for Nail Penetration Test

A: The battery did not ignite and did not smoke.
B: The battery did not ignite and smoked.
C: The battery ignited.

The results are shown in the table which will be given later.

TABLE 2

| | Resin film | | Positive electrode collector | | | | | | | |
|---|---|---|---|---|---|---|---|---|---|---|
| | | | Front | | | | | Back | | |
| | | | Conductive layer | | | Contact resistance reducing layer | | Conductive layer | | |
| | Type | Thickness (μm) | Type | Thickness (nm) | Ra (μm) | Type | Thickness (nm) | Type | Thickness (nm) | Ra (μm) |
| Example 19 | PET | 12 | Al vapor-deposited | 300 | 0.25 | Rust preventive | 50 | Al vapor-deposited | 300 | 0.25 |
| Example 20 | PET | 12 | Al vapor-deposited | 300 | 0.25 | None | — | None | — | — |
| Example 21 | C resin (molded) | 85 | Al vapor-deposited | 300 | 0.25 | Rust preventive | 50 | Al vapor-deposited | 300 | 0.25 |
| Example 22 | C resin (molded) | 85 | Al vapor-deposited | 300 | 0.25 | Rust preventive | 50 | Al foil | 10,000 | 0.25 |
| Example 23 | C resin (coated) | 85 | Al vapor-deposited | 300 | 0.25 | Rust preventive | 50 | Al foil | 10,000 | 0.25 |
| Example 24 | C resin (coated) | 20 | Al vapor-deposited | 300 | 0.25 | Rust preventive | 50 | Al foil | 10,000 | 0.25 |
| Example 25 | PET | 12 | Al vapor-deposited | 300 | 0.25 | None | — | None | — | — |
| Example 26 | PET | 12 | Al vapor-deposited | 300 | 0.25 | None | — | None | — | — |
| Example 27 | PET | 12 | Al vapor-deposited | 300 | 0.25 | None | — | None | — | — |
| Example 28 | PET | 12 | Al vapor-deposited | 300 | 0.25 | None | — | None | — | — |
| Example 29 | PET | 12 | Al vapor-deposited | 300 | 0.25 | None | — | None | — | — |
| Comparative Example 3 | None | — | Al foil | 20,000 | 0.25 | Conductive carbon | 200 | Al foil | 20,000 | 0.25 |

TABLE 2-continued

| | Positive electrode collector Back | | Negative electrode collector | | | | | | |
|---|---|---|---|---|---|---|---|---|---|
| | Contact resistance reducing layer | | Resin film | | Front | | | | |
| | | | | | Conductive layer | | | Contact resistance reducing layer | |
| | Type | Thickness (nm) | Type | Thickness (μm) | Type | Thickness (nm) | Ra (μm) | Type | Thickness (nm) |
| Example 19 | Rust preventive | 50 | PET | 12 | Cu vapor-deposited | 300 | 0.25 | None | — |
| Example 20 | None | — | PET | 12 | Cu vapor-deposited | 300 | 0.25 | Rust preventive | 50 |
| Example 21 | Rust preventive | 50 | PET | 12 | Cu vapor-deposited | 300 | 0.25 | None | — |
| Example 22 | Rust preventive | 50 | PET | 12 | Cu vapor-deposited | 300 | 0.25 | None | — |
| Example 23 | Rust preventive | 50 | PET | 12 | Cu vapor-deposited | 300 | 0.25 | None | — |
| Example 24 | Rust preventive | 50 | PET | 12 | Cu vapor-deposited | 300 | 0.25 | None | — |
| Example 25 | None | — | C resin (molde) | 85 | Cu vapor-deposited | 300 | 0.25 | Rust preventive | 50 |
| Example 26 | None | — | C resin (molde) | 85 | Cu vapor-deposited | 300 | 0.25 | Rust preventive | 50 |
| Example 27 | None | — | C resin (molde) | 85 | Cu vapor-deposited | 300 | 0.25 | Rust preventive | 50 |
| Example 28 | None | — | C resin (coated) | 85 | Cu vapor-deposited | 300 | 0.25 | Rust preventive | 50 |
| Example 29 | None | — | C resin (coated) | 20 | Cu vapor-deposited | 300 | 0.25 | Rust preventive | 50 |
| Comparative Example 3 | Conductive carbon | 200 | PET | 12 | Cu vapor-deposited | 300 | 0.25 | None | — |

| | Negative electrode collector Back | | | | | | |
|---|---|---|---|---|---|---|---|
| | Conductive layer | | | Contact resistance reducing layer | | | |
| | Type | Thickness (nm) | Ra (μm) | Type | Thickness (nm) | Cycle | Safety |
| Example 19 | None | — | — | None | — | A | A |
| Example 20 | Cu vapor-deposited | 300 | 0.25 | Rust preventive | 50 | A | A |
| Example 21 | None | — | — | None | — | C | A |
| Example 22 | None | — | — | None | — | B | B |
| Example 23 | None | — | — | None | — | A | B |
| Example 24 | None | — | — | None | — | S | B |
| Example 25 | Cu vapor-deposited | 300 | 0.25 | Rust preventive | 50 | C | A |
| Example 26 | Cu foil | 10,000 | 0.25 | Rust preventive | 50 | B | B |
| Example 27 | Cu foil | 2,000 | 0.25 | Rust preventive | 50 | B | A |
| Example 28 | Cu foil | 2,000 | 0.25 | Rust preventive | 50 | A | A |
| Example 29 | Cu foil | 2,000 | 0.25 | Rust preventive | 50 | S | A |
| Comparative Example 3 | None | — | — | None | — | C | C |

As shown in Table 2 above, all of the monopolar type non-aqueous electrolyte secondary batteries having the collector specified in the present invention exhibited excellent cycle characteristics and excellent safety (Examples 19 to 29).

Example 30

A non-aqueous electrolytic solution, a slurry for forming a positive electrode active material layer, a slurry for forming a negative electrode active material layer, and a separator were prepared in the same manner as in Example 1.

Preparation of Bipolar Type Non-Aqueous Electrolyte Secondary Battery

A bipolar type non-aqueous electrolyte secondary battery having a laminated structure shown in FIG. 5 was prepared as follows.

Preparation of Bipolar Collector

The carbon resin film (molded product) having a thickness of 85 μm of Example 21 was used as the resin film, aluminum was vapor-deposited on one surface (positive electrode surface) of this film, and copper was vapor-deposited on the other surface (negative electrode surface) of this film to form conductive layers having a thickness of 300 μm on both surfaces of the film.

Using an ethanol solution prepared by dissolving 1,2,3-benzotriazole at a concentration of 2% by mass, a rust preventive layer having a thickness of 50 nm was formed on each of the conductive layers on both surfaces. In this manner, a bipolar collector having laminated structures of a conductive layer and a contact resistance reducing layer (rust preventive layer) on both surfaces of the resin film was obtained.

Preparation of Bipolar Electrode

On the rust preventive layers on both surfaces of the bipolar collector obtained above, the slurry for forming a positive electrode active material layer was applied onto the aluminum deposition layer side and dried to form a positive electrode active material layer having a thickness of 80 μm, and the slurry for forming a negative electrode active material layer was applied onto the copper deposition layer side and dried to form a negative electrode active material layer having a thickness of 80 μm. In this manner, a bipolar electrode having a positive electrode active material layer on one surface (positive electrode surface) of the bipolar collector and a negative electrode active material layer on the other surface (negative electrode surface) of the bipolar collector was obtained.

Preparation of Positive Electrode Collector

A PET film having a thickness of 12 μm was used as a resin film, and aluminum was vapor-deposited on the film to form a conductive layer having a thickness of 300 nm. In this manner, a positive electrode collector was obtained.

Preparation of Positive Electrode

The slurry for forming a positive electrode active material layer was applied onto the conductive layer of the positive electrode collector obtained above and dried to form a positive electrode active material layer having a thickness of 80 μm to thereby obtain a positive electrode.

Preparation of Negative Electrode Collector

A PET film having a thickness of 12 μm was used as a resin film, and copper was vapor-deposited on the film to form a conductive layer having a thickness of 300 nm. In this manner, a negative electrode collector was obtained.

Preparation of Negative Electrode

The slurry for forming a negative electrode active material layer was applied onto the conductive layer of the negative electrode collector obtained above and dried to form a negative electrode active material layer having a thickness of 80 μm to thereby obtain a negative electrode.

Preparation of Non-Aqueous Electrolyte Secondary Battery

The obtained negative electrode and separator were laminated on an aluminum laminated film, a silicone insulating film in a frame shape with holes of the same area as the negative electrode and the separator was disposed around the negative electrode and the separator, the positive electrode surface of the bipolar electrode was laminated so as to be in contact with the separator, and then an electrolytic solution was injected into the silicone insulating layer, followed by sealing. Subsequently, the separator was laminated on the negative electrode surface of the bipolar electrode, the silicone insulating film in the frame shape was disposed around the bipolar electrode and the separator, the positive electrode was laminated so as to be in contact with the separator, and the electrolytic solution was injected into the insulating layer, followed by sealing. Wiring lines (tabs) were connected to the conductive layers of the positive electrode and the negative electrode, these wiring lines were pulled out to the outside, and then the aluminum laminated film was sealed to obtain a non-aqueous electrolyte secondary battery. The obtained non-aqueous electrolyte secondary battery was charged and discharged three times at 25° C. by charge at a current value of 30 mA and a final voltage of 8.4 V and then discharge at a current value of 30 mA and a final voltage of 3.0 V. In this manner, a bipolar type non-aqueous electrolyte secondary battery having a capacity of 300 mAh was obtained.

Example 31

A bipolar type non-aqueous electrolyte secondary battery was obtained in the same manner as in Example 30 except that, in Example 30, the preparation of the bipolar collector was changed as follows.

Preparation of Bipolar Collector

The carbon resin film (molded product) having a thickness of 85 μm of Example 21 and a copper foil MT18FL with a carrier (manufactured by Mitsui Mining & Smelting Co., Ltd.) of copper foil (2 μm)/carrier copper foil (18 μm) were laminated and the resulting structure was treated by a hot roll press to obtain a carbon resin film (85 μm)/copper foil (2 μm)/carrier copper foil (18 μm) laminate. Further, aluminum was vapor-deposited on the side of the carbon resin film opposite to the side having the copper foil to form a conductive layer having a thickness of 300 nm. Then, the carrier copper foil was peeled off to obtain a conductive layer (300 nm)/carbon resin film (85 μm)/copper foil (2 μm) laminate. Using an ethanol solution prepared by dissolving 1,2,3-benzotriazole at a concentration of 2% by mass, a rust preventive layer having a thickness of 50 nm was formed on each of the conductive layers (foil and vapor-deposited film) on both surfaces. In this manner, a bipolar collector having laminated structures of a conductive layer and a contact resistance reducing layer (rust preventive layer) on both surfaces of the resin film was obtained.

Example 32

A bipolar type non-aqueous electrolyte secondary battery was obtained in the same manner as in Example 31 except that, in Example 31, the preparation of the bipolar collector was changed as follows.

Preparation of Bipolar Collector

The paste containing a carbon resin of Example 23 was applied onto a copper foil MT18FL with a carrier (manufactured by Mitsui Mining & Smelting Co., Ltd.) of copper foil (2 μm)/carrier copper foil (18 μm) and dried to form a carbon resin film (coating film) having a thickness of 85 μm. Next, aluminum was vapor-deposited on the side of the carbon resin film opposite to the side having the copper foil to form a conductive layer having a thickness of 300 nm. Then, the carrier copper foil was peeled off to obtain a conductive layer (300 nm)/carbon resin film (85 μm)/copper foil (2 μm) laminate. Using an ethanol solution prepared by dissolving 1,2,3-benzotriazole at a concentration of 2% by mass, a rust preventive layer having a thickness of 50 nm was formed on each of the conductive layers (foil and vapor-deposited film) on both surfaces. In this manner, a bipolar collector having laminated structures of a conductive layer and a contact resistance reducing layer (rust preventive layer) on both surfaces of the resin film was obtained.

Example 33

A bipolar type non-aqueous electrolyte secondary battery was obtained in the same manner as in Example 32, except that, in Example 32, the thickness of the carbon resin film (coating film) constituting the bipolar collector was 20 μm.

Example 34

A bipolar type non-aqueous electrolyte secondary battery was obtained in the same manner as in Example 33, except that, in Example 33, the aluminum deposition layer constituting the bipolar collector was replaced with a nickel deposition layer.

Example 35

A bipolar type non-aqueous electrolyte secondary battery was obtained in the same manner as in Example 34, except that, in the preparation of the bipolar collector of Example 34, a paste (medium: mesitylene) prepared by mixing 7 parts by mass of a liquid epoxy resin [CELLOXIDE 2021P (alicyclic epoxy resin, manufactured by Daicel Corporation)], 15 parts by mass of a polyfunctional epoxy resin [MARPROOF G2050M (manufactured by NOF Corporation)], 10 parts by mass of gold-coated particles [MICROPEARL AU (manufactured by Sekisui Chemical Co., Ltd.)], and 0.5 parts by mass of a curing agent [SAN AID SI-60 (manufactured by Sanshin Chemical Industry Co., Ltd.)] was applied onto the copper foil, instead of applying the paste containing a carbon resin.

Example 36

A bipolar type non-aqueous electrolyte secondary battery was obtained in the same manner as in Example 34, except that, in the preparation of the bipolar collector of Example 34, a paste (medium: mesitylene) prepared by mixing 7 parts by mass of a liquid epoxy resin [CELLOXIDE 2021P (alicyclic epoxy resin, manufactured by Daicel Corporation)], 15 parts by mass of a polyfunctional epoxy resin [MARPROOF G2050M (manufactured by NOF Corporation)], 10 parts by mass of a nickel powder [NIE 02PB (manufactured by Kojundo Chemical Laboratory Co., Ltd.)], and 0.5 parts by mass of a curing agent [SAN AID SI-60 (manufactured by Sanshin Chemical Industry Co., Ltd.)] was applied onto the copper foil, instead of applying the paste containing a carbon resin.

Example 37

A bipolar type non-aqueous electrolyte secondary battery was obtained in the same manner as in Example 34, except that, in the preparation of the bipolar collector of Example 34, a paste (medium: mesitylene) prepared by mixing 7 parts by mass of a liquid epoxy resin [CELLOXIDE 2021P (alicyclic epoxy resin, manufactured by Daicel Corporation)], 15 parts by mass of a polyfunctional epoxy resin [MARPROOF G2050M (manufactured by NOF Corporation)], 10 parts by mass of a silver powder [AgC-2011 (manufactured by Fukuda Metal Foil & Powder Co., Ltd.)], and 0.5 parts by mass of a curing agent [SAN AID SI-60 (manufactured by Sanshin Chemical Industry Co., Ltd.)] was applied onto the copper foil, instead of applying the paste in which a carbon resin was dissolved.

Example 38

A bipolar type non-aqueous electrolyte secondary battery was obtained in the same manner as in Example 30 except that, in Example 30, a rust preventive layer was not provided on the negative electrode surface of the bipolar collector.

Example 39

A bipolar type non-aqueous electrolyte secondary battery was obtained in the same manner as in Example 30 except that, in Example 30, both a conductive layer and a rust preventive layer were not provided on the negative electrode surface of the bipolar collector.

Comparative Example 4

A bipolar type non-aqueous electrolyte secondary battery having a capacity of 300 mAh was obtained in the same manner as in Example 30 except that, in Example 30, a laminate of a copper foil having a thickness of 2 μm and an aluminum foil side of a laminate in which the same slurry for forming a conductive carbon layer as used in Example 1 was applied onto one surface of an aluminum foil having a thickness of 10 μm and dried to form a conductive carbon layer having a thickness of 200 nm was used as the bipolar collector.

Comparative Example 5

A bipolar type non-aqueous electrolyte secondary battery having a capacity of 300 mAh was obtained in the same manner as in Example 30 except that, in Example 30, a bipolar collector in which the carbon resin film (molded product) having a thickness of 85 μm of Example 21 was used as a resin film, and aluminum was vapor-deposited on one surface of this film to form a conductive layer having a thickness of 300 μm was used as the bipolar collector.

Comparative Example 6

A bipolar type non-aqueous electrolyte secondary battery having a capacity of 300 mAh was obtained in the same manner as in Example 30 except that, in Example 30, the carbon resin film (molded product) of Example 21 was used as the bipolar collector.

Using each of the bipolar type non-aqueous electrolyte secondary batteries prepared above, the cycle characteristics and safety were evaluated as follows. The results are shown in the table which will be given later.

[Test Example 5] Cycle Characteristic Test

Using the bipolar type non-aqueous electrolyte secondary batteries prepared above, constant current charge was carried out at a current value of 30 mA and a final voltage of 8.4 V in an environment of 25° C., and then constant voltage charge was carried out at a final current value of 3 mA.

Then, constant current discharge was carried out at a current value of 300 mA and a final voltage of 3.0 V.

The discharge capacity retention rate (%) after 100 cycles was investigated with the above-mentioned one charge and one discharge as one cycle, and evaluated by application thereof to the following evaluation standards. The discharge capacity retention rate (%) is determined by the following expression.

Discharge capacity retention rate (%)=100×[discharge capacity in 100th cycle]/[discharge capacity in 1st cycle]

Evaluation Standards for Cycle Characteristics

S: The discharge capacity retention rate is 90% or more
A+: The discharge capacity retention rate is 85% or more and less than 90%
A: The discharge capacity retention rate is 80% or more and less than 85%
B+: The discharge capacity retention rate is 75% or more and less than 80%
B: The discharge capacity retention rate is 70% or more and less than 75%
C: The discharge capacity retention rate is 60% or more and less than 70%
D: The discharge capacity retention rate is less than 60%

The results are shown in the table which will be given later.

[Test Example 6] Safety Test (Nail Penetration Test)

Similar to Test Example 2, a nail penetration test was carried out in a fully charged state (SOC 100%) using the bipolar type non-aqueous electrolyte secondary batteries prepared above, and evaluation was carried out by applying the test results to the following evaluation standards. This nail penetration test is a test in which a nail is penetrated into a battery to forcibly cause an internal short circuit.

Evaluation Standards for Nail Penetration Test

A: The battery did not ignite and did not smoke.
B: The battery did not ignite and smoked.
C: The battery ignited.

The results are shown in the table which will be given later.

TABLE 3

| | Positive electrode collector | | | | | | | | | | Bipolar collector | |
| | Front | | | | | Back | | | | | | |
| | Resin film | | Conductive layer | | | Contact resistance reducing layer | | Conductive layer | | | Contact resistance reducing layer | | Resin film | |
| | Type | Thickness (μm) | Type | Thickness (nm) | Ra (μm) | Type | Thickness (nm) | Type | Thickness (nm) | Ra (μm) | Type | Thickness (nm) | Type | Thickness (μm) |
|---|---|---|---|---|---|---|---|---|---|---|---|---|---|---|
| Example 30 | PET | 12 | Al vapor-deposited | 300 | 0.25 | None | — | None | — | — | None | — | C resin molded) | 85 |
| Example 31 | PET | 12 | Al vapor-deposited | 300 | 0.25 | None | — | None | — | — | None | — | C resin molded) | 85 |
| Example 32 | PET | 12 | Al vapor-deposited | 300 | 0.25 | None | — | None | — | — | None | — | C resin coated) | 85 |
| Example 33 | PET | 12 | Al vapor-deposited | 300 | 0.25 | None | — | None | — | — | None | — | C resin coated) | 20 |
| Example 34 | PET | 12 | Al vapor-deposited | 300 | 0.25 | None | — | None | — | — | None | — | C resin coated) | 20 |
| Example 35 | PET | 12 | Al vapor-deposited | 300 | 0.25 | None | — | None | — | — | None | — | Au particles coated) | 20 |
| Example 36 | PET | 12 | Al vapor-deposited | 300 | 0.25 | None | — | None | — | — | None | — | Ni filler coated) | 20 |

TABLE 3-continued

| | | | | | | | | | | | | | | |
|---|---|---|---|---|---|---|---|---|---|---|---|---|---|---|
| Example 37 | PET | 12 | Al vapor-deposited | 300 | 0.25 | None | — | None | — | — | None | — | Ag filler coated) | 20 |
| Example 38 | PET | 12 | Al vapor-deposited | 300 | 0.25 | None | — | None | — | — | None | — | C resin molded) | 85 |
| Example 39 | PET | 12 | Al vapor-deposited | 300 | 0.25 | None | — | None | — | — | None | — | C resin molded) | 85 |
| Comparative Example 4 | PET | 12 | Al vapor-deposited | 300 | 0.25 | None | — | None | — | — | None | — | None | — |
| Comparative Example 5 | PET | 12 | Al vapor-deposited | 300 | 0.25 | None | — | None | — | — | None | — | C resin molded) | 85 |
| Comparative example 6 | PET | 12 | Al vapor-deposited | 300 | 0.25 | None | — | None | — | — | None | — | C resin molded) | 85 |

| | Bipolar collector | | | | | | | | | Negative electrode collector | |
|---|---|---|---|---|---|---|---|---|---|---|---|---|
| | Positive electrode surface | | | | Negative electrode surface | | | | | | |
| | Conductive layer | | Contact resistance reducing layer | | Conductive layer | | | Contact resistance reducing layer | | Resin film | |
| | Type | Thickness (nm) | Ra (μm) | Type | Thickness (nm) | Type | Thickness (nm) | Ra (μm) | Type | Thickness (nm) | Type | Thickness (μm) |
| Example 30 | Al vapor-deposited | 300 | 0.25 | Rust preventive | 50 | Cu vapor-deposited | 300 | 0.25 | Rust preventive | 50 | PET | 12 |
| Example 31 | Al vapor-deposited | 300 | 0.25 | Rust preventive | 50 | Cu foil | 2,000 | 0.25 | Rust preventive | 50 | PET | 12 |
| Example 32 | Al vapor-deposited | 300 | 0.25 | Rust preventive | 50 | Cu foil | 2,000 | 0.25 | Rust preventive | 50 | PET | 12 |
| Example 33 | Al vapor-deposited | 300 | 0.25 | Rust preventive | 50 | Cu foil | 2,000 | 0.25 | Rust preventive | 50 | PET | 12 |
| Example 34 | Ni vapor-deposited | 300 | 0.25 | Rust preventive | 50 | Cu foil | 2,000 | 0.25 | Rust preventive | 50 | PET | 12 |
| Example 35 | Ni vapor-deposited | 300 | 0.25 | Rust preventive | 50 | Cu foil | 2,000 | 0.25 | Rust preventive | 50 | PET | 12 |
| Example 36 | Ni vapor-deposited | 300 | 0.25 | Rust preventive | 50 | Cu foil | 2,000 | 0.25 | Rust preventive | 50 | PET | 12 |
| Example 37 | Ni vapor-deposited | 300 | 0.25 | Rust preventive | 50 | Cu foil | 2,000 | 0.25 | Rust preventive | 50 | PET | 12 |
| Example 38 | Al vapor-deposited | 300 | 0.25 | Rust preventive | 50 | Cu vapor-deposited | 300 | 0.25 | None | — | PET | 12 |
| Example 39 | Al vapor-deposited | 300 | 0.25 | Rust preventive | 50 | None | — | — | None | — | PET | 12 |
| Comparative Example 4 | Al foil | 10,000 | 0.25 | Conductive carbon | 200 | Cu foil | 2,000 | 0.25 | Rust preventive | 50 | PET | 12 |
| Comparative Example 5 | Al vapor-deposited | 300 | 0.25 | None | — | None | — | — | None | — | PET | 12 |
| Comparative example 6 | None | — | — | None | — | None | — | — | None | — | PET | 12 |

TABLE 3-continued

| | | Negative electrode collector | | | | | | | | | | |
|---|---|---|---|---|---|---|---|---|---|---|---|---|
| | | Front | | | | | Back | | | | | |
| | | Conductive layer | | | Contact resistance reducing layer | | Conductive layer | | | Contact resistance reducing layer | | |
| | Type | Thickness (nm) | Ra (μm) | Type | Thickness (nm) | Type | Thickness (nm) | Ra (μm) | Type | Thickness (nm) | Cycle characteristic: | Safety |
| Example 30 | Cu vapor-deposited | 300 | 0.25 | None | — | None | — | — | None | — | B+ | A |
| Example 31 | Cu vapor-deposited | 300 | 0.25 | None | — | None | — | — | None | — | A | A |
| Example 32 | Cu vapor-deposited | 300 | 0.25 | None | — | None | — | — | None | — | A+ | A |
| Example 33 | Cu vapor-deposited | 300 | 0.25 | None | — | None | — | — | None | — | S | A |
| Example 34 | Cu vapor-deposited | 300 | 0.25 | None | — | None | — | — | None | — | S | A |
| Example 35 | Cu vapor-deposited | 300 | 0.25 | None | — | None | — | — | None | — | S | A |
| Example 36 | Cu vapor-deposited | 300 | 0.25 | None | — | None | — | — | None | — | S | A |
| Example 37 | Cu vapor-deposited | 300 | 0.25 | None | — | None | — | — | None | — | S | A |
| Example 38 | Cu vapor-deposited | 300 | 0.25 | None | — | None | — | — | None | — | B | A |
| Example 39 | Cu vapor-deposited | 300 | 0.25 | None | — | None | — | — | None | — | C | A |
| Comparative Example 4 | Cu vapor-deposited | 300 | 0.25 | None | — | None | — | — | None | — | C | C |
| Comparative Example 5 | Cu vapor-deposited | 300 | 0.25 | None | — | None | — | — | None | — | D | A |
| Comparative example 6 | Cu vapor-deposited | 300 | 0.25 | None | — | None | — | — | None | — | D | A |

As shown in Table 3 above, all of the bipolar type non-aqueous electrolyte secondary batteries having the bipolar collector specified in the present invention exhibited excellent cycle characteristics and excellent safety (Examples 30 to 39).

Although the present invention has been described with reference to embodiments thereof, it is considered that, unless otherwise specified, even the detailed description of the invention is not limited and should be broadly interpreted without departing from the spirit and scope of the invention shown in the attached "WHAT IS CLAIMED IS".

EXPLANATION OF REFERENCES

10: sheet type non-aqueous electrolyte secondary battery
1: negative electrode collector
2: negative electrode active material layer
3: separator
4: positive electrode active material layer
5: positive electrode collector
6: operation portion (light bulb)
20: collector
21: resin film
22: conductive layer
23: contact resistance reducing layer
30: monopolar type laminate
31: negative electrode collector
32: negative electrode active material layer
33: separator
34: positive electrode active material layer
35: positive electrode collector
40: bipolar type laminate
41: negative electrode collector
42: negative electrode active material layer
43: separator
44: positive electrode active material layer
45: bipolar collector
46: positive electrode collector
50: bipolar collector
51: resin film
52: conductive layer
53: contact resistance reducing layer

What is claimed is:

1. A non-aqueous electrolyte secondary battery comprising:
a positive electrode having a positive electrode collector and a positive electrode active material layer in contact with the positive electrode collector;
a negative electrode having a negative electrode collector and a negative electrode active material layer in contact with the negative electrode collector; and
a separator disposed between the positive electrode and the negative electrode,
wherein at least one of the positive electrode collector or the negative electrode collector is a laminate having a resin film and a laminated structure of a conductive layer and a contact resistance reducing layer disposed on one or both surfaces of the resin film,
the contact resistance reducing layer contains a rust preventive material, and
the rust preventive material includes at least one of benzotriazole compounds, phosphate compounds, silicate compounds, and nitrite compounds.

2. The non-aqueous electrolyte secondary battery according to claim 1,
wherein, in a case where the positive electrode collector is constituted of the laminate, the conductive layer of the laminate is in contact with the resin film, and the contact resistance reducing layer of the laminate is in contact with the positive electrode active material layer, and
in a case where the negative electrode collector is constituted of the laminate, the conductive layer of the laminate is in contact with the resin film, and the contact resistance reducing layer of the laminate is in contact with the negative electrode active material layer.

3. The non-aqueous electrolyte secondary battery according to claim 1,
wherein, in a case where the positive electrode collector and the negative electrode collector are constituted of the laminate, the contact resistance reducing layer of the negative electrode collector contains the rust preventive material, the conductive layer of the positive electrode collector contains aluminum, and the contact resistance reducing layer of the positive electrode collector contains conductive carbon.

4. The non-aqueous electrolyte secondary battery according to claim 1,
wherein, in a case where the positive electrode collector and the negative electrode collector are constituted of the laminate, the contact resistance reducing layer of the positive electrode collector contains the rust preventive material, the conductive layer of the negative electrode collector contains at least one of copper or nickel, and the contact resistance reducing layer of the negative electrode collector contains at least one of conductive carbon, nickel, titanium, tantalum, or tungsten.

5. The non-aqueous electrolyte secondary battery according to claim 4,
wherein the conductive layer of the negative electrode collector contains copper, and the contact resistance reducing layer of the negative electrode collector contains at least one of conductive carbon or nickel.

6. The non-aqueous electrolyte secondary battery according to claim 1,
wherein a surface roughness Ra of at least one surface of the conductive layer is 0.3 μm or more.

7. The non-aqueous electrolyte secondary battery according to claim 1,
wherein at least one of the positive electrode collector or the negative electrode collector is a laminate having the resin film and the conductive layer disposed on one surface of the resin film, and a surface roughness Ra of at least one surface of the conductive layer is 0.3 μm or more.

8. The non-aqueous electrolyte secondary battery according to claim 1,
wherein a thickness of the contact resistance reducing layer is 10 to 3,000 nm.

9. The non-aqueous electrolyte secondary battery according to claim 1,
wherein a thickness of the conductive layer is 10 to 5,000 nm.

10. The non-aqueous electrolyte secondary battery according to claim 1,
wherein the resin film contains at least one of a polyester resin or a polyolefin resin.

11. The non-aqueous electrolyte secondary battery according to claim 1,
wherein a thickness of the resin film is 1 to 50 μm.

12. A collector comprising:
a resin film; and
a laminated structure of a conductive layer and a contact resistance reducing layer disposed on one or both surfaces of the resin film,
wherein the contact resistance reducing layer contains a rust preventive material, and
the rust preventive material includes at least one of benzotriazole compounds, phosphate compounds, silicate compounds, and nitrite compounds.

13. The collector according to claim 12,
wherein the conductive layer is in contact with the resin film.

14. The collector according to claim 12,
wherein the collector is a positive electrode collector, the conductive layer contains aluminum.

15. The collector according to claim 12,
wherein the collector is a negative electrode collector, the conductive layer contains at least one of copper or nickel.

16. The collector according to claim 15,
wherein the conductive layer contains copper.

17. The collector according to claim 12,
wherein a surface roughness Ra of at least one surface of the conductive layer is 0.3 μm or more.

18. The collector according to claim 12,
wherein a thickness of the contact resistance reducing layer is 10 to 3,000 nm.

19. The collector according to claim 12,
wherein a thickness of the conductive layer is 10 to 5,000 nm.

20. The collector according to claim 12,
wherein the resin film contains at least one of a polyester resin or a polyolefin resin.

21. The collector according to claim 12,
wherein a thickness of the resin film is 1 to 50 μm.

22. A method for manufacturing a non-aqueous electrolyte secondary battery comprising:
disposing the collector according to claim 13 as at least any one collector of a positive electrode collector, a negative electrode collector, or a bipolar collector.

23. A non-aqueous electrolyte secondary battery comprising:

a positive electrode having a positive electrode collector and a positive electrode active material layer in contact with the positive electrode collector;

a negative electrode having a negative electrode collector and a negative electrode active material layer in contact with the negative electrode collector; and a bipolar electrode having a bipolar collector, a positive electrode active material layer in contact with one surface of the bipolar collector, and a negative electrode active material layer in contact with the other surface of the bipolar collector, wherein the non-aqueous electrolyte secondary battery has a structure in which the positive electrode is disposed on the negative electrode active material layer side of the bipolar electrode with a separator interposed therebetween and the negative electrode is disposed on the positive electrode active material layer side of the bipolar electrode with a separator interposed therebetween, the bipolar collector is a laminate having a resin film and a laminated structure of a conductive layer and a contact resistance reducing layer disposed on one or both surfaces of the resin film the contact resistance reducing layer contains a rust preventive material, and the rust preventive material includes at least one of benzotriazole compounds, phosphate compounds, silicate compounds, and nitrite compounds.

24. The non-aqueous electrolyte secondary battery according to claim 23, wherein the conductive layer of the laminate is in contact with the resin film.

25. The non-aqueous electrolyte secondary battery according to claim 24, wherein the conductive layer on the negative electrode active material layer side of the bipolar collector constituting the bipolar electrode is a copper foil.

26. The non-aqueous electrolyte secondary battery according to claim 1, wherein the resin film is a coating film.

27. The non-aqueous electrolyte secondary battery according to claim 23, wherein the conductive layer on the positive electrode active material layer side of the bipolar collector constituting the bipolar electrode contains at least one of aluminum or nickel.

28. The non-aqueous electrolyte secondary battery according to claim 1, wherein a resin layer constituting the resin film contains at least one of elemental carbon, gold, nickel, or silver.

29. The non-aqueous electrolyte secondary battery according to claim 1, wherein a thickness of the contact resistance reducing layer being a rust preventive layer is 10 to 100 nm.

30. The collector according to claim 12, wherein a thickness of the contact resistance reducing layer being a rust preventive layer is 10 to 100 nm.

31. The non-aqueous electrolyte secondary battery according to claim 23, wherein a thickness of the contact resistance reducing layer being a rust preventive layer is 10 to 100 nm.

* * * * *